United States Patent
Passey et al.

(10) Patent No.: US 7,590,652 B2
(45) Date of Patent: Sep. 15, 2009

(54) SYSTEMS AND METHODS OF REVERSE LOOKUP

(75) Inventors: Aaron J. Passey, Seattle, WA (US); Nathan N. White, Seattle, WA (US)

(73) Assignee: Isilon Systems, Inc., Seattle, WA (US)

( * ) Notice: Subject to any disclaimer, the term of this patent is extended or adjusted under 35 U.S.C. 154(b) by 243 days.

(21) Appl. No.: 11/507,075

(22) Filed: Aug. 18, 2006

(65) Prior Publication Data

US 2008/0046445 A1    Feb. 21, 2008

(51) Int. Cl.
G06F 7/00 (2006.01)
G06F 17/00 (2006.01)

(52) U.S. Cl. .............. 707/102; 707/103 X; 707/103 Y; 707/103 Z; 707/104.1

(58) Field of Classification Search ............. 707/103 R, 707/103 X, 103 Z, 104.1
See application file for complete search history.

(56) References Cited

U.S. PATENT DOCUMENTS

| | | | |
|---|---|---|---|
| 5,163,131 A | 11/1992 | Row et al. | |
| 5,181,162 A | 1/1993 | Smith et al. | |
| 5,230,047 A | 7/1993 | Frey et al. | |
| 5,251,206 A | 10/1993 | Calvignac et al. | |
| 5,258,984 A | 11/1993 | Menon et al. | |
| 5,329,626 A | 7/1994 | Klein et al. | |
| 5,359,594 A | 10/1994 | Gould et al. | |
| 5,403,639 A | 4/1995 | Belsan et al. | |
| 5,548,724 A | 8/1996 | Akizawa et al. | |
| 5,596,709 A | 1/1997 | Bond et al. | |
| 5,612,865 A | 3/1997 | Dasgupta | |
| 5,657,439 A | 8/1997 | Jones et al. | |
| 5,668,943 A | 9/1997 | Attanasio et al. | |
| 5,694,593 A | 12/1997 | Baclawski | |
| 5,696,895 A | 12/1997 | Hemphill et al. | |
| 5,734,826 A | 3/1998 | Olnowich et al. | |
| 5,761,659 A | 6/1998 | Bertoni | |
| 5,774,643 A | 6/1998 | Lubbers et al. | |
| 5,799,305 A | 8/1998 | Bortvedt et al. | |
| 5,805,578 A | 9/1998 | Stirpe et al. | |
| 5,805,900 A | 9/1998 | Fagen et al. | |

(Continued)

FOREIGN PATENT DOCUMENTS

EP   0774723   5/1997

(Continued)

OTHER PUBLICATIONS

Nov. 15, 2002 International Search Report PCT/US02/24728.

(Continued)

*Primary Examiner*—James Trujillo
*Assistant Examiner*—Jorge A Casanova
(74) *Attorney, Agent, or Firm*—Knobbe, Martens, Olson & Bear, LLP.

(57) ABSTRACT

One embodiment includes a process for reverse lookups using a map structure and a structure being referenced by the map structure that comprises receiving a structure that comprises a reference to the structure and a reverse lookup hint; locating one or more entries in a map structure that correspond to the reverse lookup hint; and identifying at least one matching entry in the map structure that corresponds to the structure.

19 Claims, 23 Drawing Sheets

U.S. PATENT DOCUMENTS

| | | | |
|---|---|---|---|
| 5,806,065 A | 9/1998 | Lomet | |
| 5,822,790 A | 10/1998 | Mehrotra | |
| 5,862,312 A | 1/1999 | Mann | |
| 5,870,563 A | 2/1999 | Roper et al. | |
| 5,878,410 A | 3/1999 | Zbikowski et al. | |
| 5,878,414 A | 3/1999 | Hsiao et al. | |
| 5,884,046 A | 3/1999 | Antonov | |
| 5,884,098 A | 3/1999 | Mason, Jr. | |
| 5,884,303 A | 3/1999 | Brown | |
| 5,890,147 A | 3/1999 | Peltonen et al. | |
| 5,933,834 A | 8/1999 | Aichelen | |
| 5,943,690 A | 8/1999 | Dorricott et al. | |
| 5,996,089 A | 11/1999 | Mann | |
| 6,021,414 A | 2/2000 | Fuller | |
| 6,029,168 A | 2/2000 | Frey | |
| 6,038,570 A | 3/2000 | Hitz et al. | |
| 6,044,367 A | 3/2000 | Wolff | |
| 6,055,543 A | 4/2000 | Christensen et al. | |
| 6,070,172 A | 5/2000 | Lowe | |
| 6,081,833 A | 6/2000 | Okamoto et al. | |
| 6,081,883 A | 6/2000 | Popelka et al. | |
| 6,108,759 A | 8/2000 | Orcutt et al. | |
| 6,117,181 A | 9/2000 | Dearth et al. | |
| 6,122,754 A | 9/2000 | Litwin et al. | |
| 6,138,126 A | 10/2000 | Hitz et al. | |
| 6,154,854 A | 11/2000 | Stallmo | |
| 6,173,374 B1 | 1/2001 | Heil et al. | |
| 6,209,059 B1 | 3/2001 | Ofer et al. | |
| 6,219,693 B1 | 4/2001 | Napolitano et al. | |
| 6,321,345 B1 | 11/2001 | Mann | |
| 6,334,168 B1 | 12/2001 | Islam et al. | |
| 6,353,823 B1 | 3/2002 | Kumar | |
| 6,384,626 B2 | 5/2002 | Tsai et al. | |
| 6,385,626 B1 | 5/2002 | Tamer et al. | |
| 6,397,311 B1 | 5/2002 | Capps | |
| 6,408,313 B1 | 6/2002 | Campbell et al. | |
| 6,434,574 B1 | 8/2002 | Day et al. | |
| 6,449,730 B2 | 9/2002 | Mann et al. | |
| 6,453,389 B1 | 9/2002 | Weinberger et al. | |
| 6,457,139 B1 | 9/2002 | D'Errico et al. | |
| 6,502,172 B2 | 12/2002 | Chang | |
| 6,502,174 B1 | 12/2002 | Beardsley et al. | |
| 6,526,478 B1 | 2/2003 | Kirby | |
| 6,546,443 B1 | 4/2003 | Kakivaya et al. | |
| 6,549,513 B1 | 4/2003 | Chao et al. | |
| 6,557,114 B2 | 4/2003 | Mann | |
| 6,567,894 B1 | 5/2003 | Hsu et al. | |
| 6,567,926 B2 | 5/2003 | Mann | |
| 6,571,244 B1 | 5/2003 | Larson | |
| 6,571,349 B1 | 5/2003 | Mann | |
| 6,574,745 B2 | 6/2003 | Mann | |
| 6,594,655 B2* | 7/2003 | Tal et al. | 707/3 |
| 6,594,660 B1 | 7/2003 | Berkowitz et al. | |
| 6,598,174 B1 | 7/2003 | Parks et al. | |
| 6,618,798 B1 | 9/2003 | Burton et al. | |
| 6,662,184 B1* | 12/2003 | Friedberg | 707/100 |
| 6,671,686 B2 | 12/2003 | Pardon et al. | |
| 6,671,704 B1 | 12/2003 | Gondi et al. | |
| 6,732,125 B1 | 5/2004 | Autrey et al. | |
| 6,848,029 B2 | 1/2005 | Coldewey | |
| 6,907,011 B1 | 6/2005 | Miller et al. | |
| 6,917,942 B1 | 7/2005 | Burns et al. | |
| 6,922,696 B1 | 7/2005 | Lincoln et al. | |
| 6,934,878 B2 | 8/2005 | Massa et al. | |
| 6,940,966 B2 | 9/2005 | Lee | |
| 6,954,435 B2 | 10/2005 | Billhartz et al. | |
| 7,007,044 B1 | 2/2006 | Rafert et al. | |
| 7,007,097 B1 | 2/2006 | Huffman et al. | |
| 7,069,320 B1 | 6/2006 | Chang et al. | |
| 7,111,305 B2* | 9/2006 | Solter et al. | 719/318 |
| 7,124,264 B2 | 10/2006 | Yamashita | |
| 7,146,524 B2 | 12/2006 | Patel et al. | |
| 7,152,182 B2 | 12/2006 | Ji et al. | |
| 7,177,295 B1 | 2/2007 | Sholander et al. | |
| 7,184,421 B1 | 2/2007 | Liu et al. | |
| 7,228,299 B1* | 6/2007 | Harmer et al. | 707/3 |
| 7,240,235 B2 | 7/2007 | Lewalski-Brechter | |
| 7,257,257 B2 | 8/2007 | Anderson et al. | |
| 7,318,134 B1 | 1/2008 | Oliveira et al. | |
| 7,373,426 B2* | 5/2008 | Jinmei et al. | 709/245 |
| 7,451,341 B2 | 11/2008 | Okaki et al. | |
| 7,509,448 B2 | 3/2009 | Fachan et al. | |
| 2001/0047451 A1 | 11/2001 | Noble et al. | |
| 2002/0035668 A1 | 3/2002 | Nakano et al. | |
| 2002/0038436 A1 | 3/2002 | Suzuki | |
| 2002/0055940 A1 | 5/2002 | Elkan | |
| 2002/0072974 A1 | 6/2002 | Pugliese et al. | |
| 2002/0075870 A1 | 6/2002 | de Azevedo et al. | |
| 2002/0083078 A1 | 6/2002 | Pardon et al. | |
| 2002/0087366 A1 | 7/2002 | Collier et al. | |
| 2002/0095438 A1 | 7/2002 | Rising et al. | |
| 2002/0124137 A1 | 9/2002 | Ulrich et al. | |
| 2002/0138559 A1 | 9/2002 | Ulrich et al. | |
| 2002/0156840 A1 | 10/2002 | Ulrich et al. | |
| 2002/0156891 A1 | 10/2002 | Ulrich et al. | |
| 2002/0156973 A1 | 10/2002 | Ulrich et al. | |
| 2002/0156974 A1 | 10/2002 | Ulrich et al. | |
| 2002/0156975 A1 | 10/2002 | Staub et al. | |
| 2002/0161846 A1 | 10/2002 | Ulrich et al. | |
| 2002/0161850 A1 | 10/2002 | Ulrich et al. | |
| 2002/0161973 A1 | 10/2002 | Ulrich et al. | |
| 2002/0163889 A1* | 11/2002 | Yemini et al. | 370/238 |
| 2002/0165942 A1 | 11/2002 | Ulrich et al. | |
| 2002/0166026 A1 | 11/2002 | Ulrich et al. | |
| 2002/0166079 A1 | 11/2002 | Ulrich et al. | |
| 2002/0169827 A1 | 11/2002 | Ulrich et al. | |
| 2002/0174295 A1 | 11/2002 | Ulrich et al. | |
| 2002/0174296 A1 | 11/2002 | Ulrich et al. | |
| 2002/0178162 A1 | 11/2002 | Ulrich et al. | |
| 2002/0191311 A1 | 12/2002 | Ulrich et al. | |
| 2002/0194523 A1 | 12/2002 | Ulrich et al. | |
| 2002/0194526 A1 | 12/2002 | Ulrich et al. | |
| 2002/0198864 A1 | 12/2002 | Ostermann et al. | |
| 2003/0005159 A1 | 1/2003 | Kumhyr | |
| 2003/0014391 A1* | 1/2003 | Evans et al. | 707/1 |
| 2003/0033308 A1 | 2/2003 | Patel et al. | |
| 2003/0109253 A1 | 6/2003 | Fenton et al. | |
| 2003/0120863 A1 | 6/2003 | Lee et al. | |
| 2003/0125852 A1 | 7/2003 | Schade et al. | |
| 2003/0131860 A1 | 7/2003 | Ashcraft et al. | |
| 2003/0135514 A1 | 7/2003 | Patel et al. | |
| 2003/0158873 A1 | 8/2003 | Sawdon et al. | |
| 2003/0163726 A1 | 8/2003 | Kidd | |
| 2003/0172149 A1 | 9/2003 | Edsall et al. | |
| 2003/0182325 A1 | 9/2003 | Manely et al. | |
| 2004/0003053 A1 | 1/2004 | Williams | |
| 2004/0024963 A1 | 2/2004 | Talagala et al. | |
| 2004/0133670 A1 | 7/2004 | Kaminksky et al. | |
| 2004/0153479 A1 | 8/2004 | Mikesell et al. | |
| 2004/0189682 A1 | 9/2004 | Troyansky et al. | |
| 2004/0199734 A1 | 10/2004 | Rajamani et al. | |
| 2004/0205141 A1 | 10/2004 | Goland | |
| 2004/0230748 A1 | 11/2004 | Ohba | |
| 2004/0260673 A1 | 12/2004 | Hitz et al. | |
| 2005/0066095 A1 | 3/2005 | Mullick et al. | |
| 2005/0114402 A1 | 5/2005 | Guthrie | |
| 2005/0114609 A1 | 5/2005 | Shorb | |
| 2005/0171960 A1 | 8/2005 | Lomet | |
| 2005/0171962 A1 | 8/2005 | Martin et al. | |
| 2005/0188052 A1 | 8/2005 | Ewanchuk et al. | |
| 2005/0192993 A1 | 9/2005 | Messinger | |
| 2005/0289169 A1 | 12/2005 | Adya et al. | |
| 2005/0289188 A1 | 12/2005 | Nettleton et al. | |
| 2006/0004760 A1 | 1/2006 | Clift et al. | |

| | | | |
|---|---|---|---|
| 2006/0059467 | A1 | 3/2006 | Wong |
| 2006/0074922 | A1 | 4/2006 | Nishimura |
| 2006/0095438 | A1 | 5/2006 | Fachan et al. |
| 2006/0101062 | A1 | 5/2006 | Godman et al. |
| 2006/0129584 | A1 | 6/2006 | Hoang et al. |
| 2006/0129631 | A1 | 6/2006 | Na et al. |
| 2006/0129983 | A1 | 6/2006 | Feng |
| 2006/0230411 | A1 | 10/2006 | Richter et al. |
| 2006/0277432 | A1 | 12/2006 | Patel |
| 2007/0091790 | A1 | 4/2007 | Passey et al. |
| 2007/0094269 | A1 | 4/2007 | Mikesell et al. |
| 2007/0094277 | A1 | 4/2007 | Fachan et al. |
| 2007/0094310 | A1 | 4/2007 | Passey et al. |
| 2007/0094431 | A1 | 4/2007 | Fachan |
| 2007/0094452 | A1 | 4/2007 | Fachan |
| 2007/0168351 | A1 | 7/2007 | Fachan |
| 2007/0171919 | A1 | 7/2007 | Godman et al. |
| 2007/0195810 | A1 | 8/2007 | Fachan |
| 2007/0233684 | A1 | 10/2007 | Verma et al. |
| 2007/0233710 | A1 | 10/2007 | Passey et al. |
| 2008/0005145 | A1 | 1/2008 | Worrall |
| 2008/0010507 | A1 | 1/2008 | Vingralek |
| 2008/0021907 | A1 | 1/2008 | Patel et al. |
| 2008/0031238 | A1 | 2/2008 | Harmelin et al. |
| 2008/0034004 | A1 | 2/2008 | Cisler et al. |
| 2008/0044016 | A1 | 2/2008 | Henzinger |
| 2008/0046432 | A1 | 2/2008 | Anderson et al. |
| 2008/0046443 | A1 | 2/2008 | Fachan et al. |
| 2008/0046444 | A1 | 2/2008 | Fachan et al. |
| 2008/0046445 | A1 | 2/2008 | Passey et al. |
| 2008/0046475 | A1 | 2/2008 | Anderson et al. |
| 2008/0046476 | A1 | 2/2008 | Anderson et al. |
| 2008/0046667 | A1 | 2/2008 | Fachan et al. |
| 2008/0059541 | A1 | 3/2008 | Fachan et al. |
| 2008/0126365 | A1 | 5/2008 | Fachan et al. |
| 2008/0154978 | A1 | 6/2008 | Lemar et al. |
| 2008/0168458 | A1 | 7/2008 | Fachan et al. |

FOREIGN PATENT DOCUMENTS

| | | |
|---|---|---|
| WO | WO 94/29796 | 12/1994 |
| WO | WO 00/57315 | 9/2000 |
| WO | WO 01/14991 | 3/2001 |
| WO | WO 01/33829 | 5/2001 |
| WO | WO 02/061737 | 8/2002 |
| WO | WO 03/012699 | 2/2003 |
| WO | WO 2004/046971 | 6/2004 |
| WO | WO 2008/021527 | 2/2008 |
| WO | WO 2008/021528 | 2/2008 |

OTHER PUBLICATIONS

Apr. 20, 2004 International Search Report PCT/US03/36699.
Aug. 6, 2004 International Search Report PCT/US03/33704.
European Search Report dated May 21, 2007 issued to EP application No. 02756944.1-2201.
Philip A. Bernstein, Vassos Hadzilacos, and Nathan Goodman, *Concurrency Control and Recovery in Database Systems*, Addison-Wesley, 1987.
Birk, Y., *Deterministic load-balancing schemes for disk-based video-on-demand storage servers*, Mass Storage Systems 1995; Storage—At the Forefront of Information Infrastructures', Proceedings of the Fourteenth IEEE Symposium on Monterey, CA, Sep. 11-14, 1995, pp. 17-25.
Kenneth P. Birman, *Building Secure and Reliable Network Applications*, Manning, 1996, pp. 1-327.
Kenneth P. Birman, *Building Secure and Reliable Network Applications*, Manning, 1996, pp. 328-619.
Coulouris et al., *Distributed Systems Concepts and Design*; Addison-Wesley, Second Edition, 1994, pp. 353-371 and 377-405.
Jim Gray and Andreas Reuter, *Transaction Processing: Concepts and Techniques*, Morgan Kaufmann, 1993, pp. 1-328.
Jim Gray and Andreas Reuter, *Transaction Processing: Concepts and Techniques*, Morgan Kaufmann, 1993, pp. 329-664.
Jim Gray and Andreas Reuter, *Transaction Processing: Concepts and Techniques*, Morgan Kaufmann, 1993, pp. 665-1105.
Nancy A. Lynch, *Distributed Algorithms*, Morgan Kaufmann, 1996, pp. 1-409.
Nancy A. Lynch, *Distributed Algorithms*, Morgan Kaufmann, 1996 pp. 410-871.
Sape Mullender, editor, *Distributed Systems* ($2^{nd}$ Ed.), ACM Press/Addison-Wesley Publishing Co., New York, NY, USA, 1993, pp. 1-327.
Sape Mullender, editor, *Distributed Systems* ($2^{nd}$ Ed.), ACM Press/Addison-Wesley Publishing Co., New York, NY, USA, 1993, pp. 328-604.
Gibson, Garth A. et al., *The Scotch Parallel Storage System*, IEEE, 1995, pp. 403-410.
Gerhard Weikum, et al., *Transactional Information Systems: Theory, Algorithms, and the Practice of Concurrency Control and Recovery*, Morgan Kaufmann, 2002, pp. 1-450.
Gerhard Weikum, et al., *Transactional Information Systems: Theory, Algorithms, and the Practice of Concurrency Control and Recovery*, Morgan Kaufmann, 2002, pp. 451-863.
Sanjay Ghemawat et al., *The Google File System*, Symposium on Operating Systems Principles, Oct. 19-22, 2003, 15 pages, Bolton Landing, NY.
Pei Cao et al., The TickerTAIP parallel RAID architecture, 1993, 12 pages, Princeton, NJ.
Pei Cao et al., The TickerTAIP parallel RAID architecture, ACM Transactions on Computer Systems, vol. 12, No. 3, Aug. 1994, 34 pages, Palto Alto, California.
Bob Duzett, et al., *An Overview of the nCube 3 Supercomputer*, IEEE, Jul. 1992, pp. 458-464.
John Henry Hartman, *The Zebra Striped Network File System*, (Sc.B. (Brown University) 1987, pp. 1-148.
Darrell D.E, Long et al., *Swift/RAID: A Distributed RAID System*, Computing Systems, vol. 7, No. 3 Summer 1994, pp. 333-359.
Michael Stonebraker et al., *Distributed Raid: A new Multiple copy Algorithm*, IEEE 1990, pp. 430-434, Berkeley, California.
Stallings, William, *Operating Systems*, Prentice Hall, Fourth Edition; 2001, pp. 197-253 and 265-293.
United States Court of Appeals, Federal Circuit, *Seachange International, Inc.* vs. *nCUBE, Corp.*, Oct. 26, 2004, 28 pages.
United States Court of Appeals, Federal Circuit, *Seachange International, Inc.* vs. *C-Corp, Inc.*, Jun. 29, 2005, 22 pages.
United States District Court, Delaware, *Seachange International, Inc.* vs. *nCUBE, Corp.*, Apr. 7, 2004, 13 pages.
United States District Court, Delaware, *Seachange International, Inc.* vs. *nCUBE, Corp.*, Aug. 29, 2000, 12 pages.
Feb. 22, 2008 Int'l Search report PCT/US07/018326, 20 pages ISIL.022VPC.
May 8, 2008Int'l Search report PCT/US07/018324, 13 pages.
Steven M. Bauer, Letter to Steve Goldman, Jul. 31, 2006 (including the first page of the patents), 8 pages.
Arthur S. Rose, Letter to Steven M. Bauer, Aug. 7, 2006, 2 pages.
Steven M. Bauer, Letter to Arthur S. Rose, Sep. 25, 2006, 2 pages.
Steven M. Bauer, Letter to Arthur S. Rose, Oct. 31, 2006, 1 page.
Arthur S. Rose, Letter to Steven M. Bauer, Nov. 9, 2006, 2 pages.
Steven M. Bauer, Letter to Arthur S. Rose, Feb. 6, 2007, 2 pages.
Arthur S. Rose, Letter to Steven M. Bauer, Feb. 23, 2007, 1 page.
Steven M. Bauer, Letter to Arthur S. Rose, Jun. 7, 2007 (including claim chart), 28 pages.
Arthur S. Rose, Letter to Steven M. Bauer, Jun. 22, 2007, 1 page.
Todd A. Gerety, Letter to Arthur S. Rose, Jun. 26, 2007 (exhibits listed separately), 1 page.
Isilon Systems, "Isilon IQ Plateform Overview", 4 pages, 2007 (Exhibit A).
Isilon Systems, "Uncompromising Reliability through Clustered Storage", Sep. 2006, 10 pages (Exhibit B).
Byteandswitch, "Discovery Chooses Isilon," Apr. 23, 2007, 1 page (Exhibit C).
Taneja Group Technology Analysts, "The Power of InfiniBand and Clustered Storage", Dec. 2005, 8 pages (Exhibit E).
Arthur S. Rose, Letter to Steven M. Bauer, Aug. 31, 2007, 4 pages.

Ramez Elmasri, Fundamentals of Database Systems 3rd ed, Sep. 30, 1999, Addison-Wesley, pp. 155, 169, 171, 172, 173, 178, 181, 182, 381, 771.

MCSA/MSCE/MCDBA Self Paced Training Kit: MS SQL Server 2000 System Administration, May 14, 2003, Microsoft Press, Second Edition, 12 pages.

Supp EPO Search Report, App. No. EP 03 78 3599; dated Apr. 29, 2008, 2 pages.

Levy E Ed—Institute of Electrical and Electronics Engineers: "Incremental restart (database management)" Proceedings of the International Conference on Data Engineering. Kobe, JP, Apr. 8-12, 1991; [Proceedings of the International Conference on Data Engineering], Los Alamitos, IEEE Comp. Soc. Press, U.S., vol. Conf. 7, Apr. 8, 1991, pp. 640-648.

Haerder T et al: "Principles of Transaction-Oriented Database Recovery" ACM Computing Surveys, ACM, New York, NY, US, vol. 15, No. 4, Dec. 1, 1983, pp. 287-317.

Gray J et al: "Transaction processing: concepts and techniques (excerpt), Passage" Transaction Processing: Concepts and Techniques, Jan. 1, 1993, pp. 373-445.

Garcia-Molina H et al: "Database System Implementation, passage" Database System Implementation, Jan. 1, 2000, pp. I-V, 423-509.

Kumar Akhil, "An analysis of borrowing polices for escrow transactions in a replicated data environment", Institute of Electrical and Electronics Engineers; Proceedings of the International Conference on Data Engineering, Los Angeles, Feb. 5-9, 1990; Los Alamitos, IEEE, Comp. Soc. Press, US. vol. Conf. 6, Feb. 5, 1990, pp. 446-454, XP010018185 ISBN: 978-0-8186-2025-6 p. 446, left-hand column, line 1—p. 447, last line.

Tanenbaum, Andrew S., MINIX Operating System, Japan, Apr. 21, 1989, 1st Edition, pp. 328, 505; Also attached is what Applicant believes is the English language version: Tanenbaum, Andrew S., Operating Systems: Design and Implementation, Prentice-Hall, 1987, pp. 279, 347, 348.

Yamashita, Hirofumi, et al., "Development of RAID Filesystem VAFS/HR," The Special Interest Group Notes of IPSJ, Japan, Information Processing Society of Japan, Sep. 16, 1994, vol. 94, No. 80, p. 9-16.

* cited by examiner

| INODE | |
|---|---|
| MODE | DIRECTORY |
| LIN | 2 |
| ○ | ○ |
| ○ | ○ |
| ○ | ○ |
| ○ | ○ |
| ○ | ○ |
| PARENT (COUNT) | 1 (1) |
| REVERSE LOOKUP HINT | 4 |

FIG. 6B

| INODE | |
|---|---|
| MODE | DIRECTORY |
| LIN | 3 |
| ○ | ○ |
| ○ | ○ |
| ○ | ○ |
| ○ | ○ |
| PARENT (COUNT) | 1 (1) |
| REVERSE LOOKUP HINT | 8 |

FIG. 6C

| INODE | |
|---|---|
| MODE | FILE |
| LIN | 4 |
| ○ | ○ |
| ○ | ○ |
| ○ | ○ |
| ○ | ○ |
| PARENT (COUNT) | 2 (2), 3 (1) |
| REVERSE LOOKUP HINT | 27 |

FIG. 6D

| INODE | |
|---|---|
| MODE | FILE |
| LIN | 5 |
| ○ | ○ |
| ○ | ○ |
| ○ | ○ |
| ○ | ○ |
| ○ | ○ |
| PARENT (COUNT) | 2 (1) |
| REVERSE LOOKUP HINT | 27 |

*FIG. 6E*

| INODE | |
|---|---|
| MODE | FILE |
| LIN | 6 |
| ○ | ○ |
| ○ | ○ |
| ○ | ○ |
| ○ | ○ |
| ○ | ○ |
| PARENT (COUNT) | 3 (1) |
| REVERSE LOOKUP HINT | 85 |

651 → MODE/FILE row
652 → LIN row
653 → PARENT (COUNT) row
654 → REVERSE LOOKUP HINT row
650 → table

FIG. 6F

| INODE | |
|---|---|
| MODE | FILE |
| LIN | 7 |
| ○ | ○ |
| ○ | ○ |
| ○ | ○ |
| ○ | ○ |
| ○ | ○ |
| PARENT (COUNT) | 3 (1) |
| REVERSE LOOKUP HINT | 34 |

FIG. 6G

| INODE | |
|---|---|
| MODE | FILE |
| LIN | 8 |
| ○ | ○ |
| ○ | ○ |
| ○ | ○ |
| ○ | ○ |
| ○ | ○ |
| PARENT (COUNT) | 3 (1) |
| REVERSE LOOKUP HINT | 130 |

*FIG. 6H*

| INODE | |
| --- | --- |
| MODE | FILE |
| LIN | 9 |
| ○ | ○ |
| ○ | ○ |
| ○ | ○ |
| ○ | ○ |
| ○ | ○ |
| PARENT (COUNT) | 2 (1) |
| REVERSE LOOKUP HINT | 11 |

681 — MODE/FILE row
682 — LIN row
683 — PARENT (COUNT) row
684 — REVERSE LOOKUP HINT row
680 — table

FIG. 61

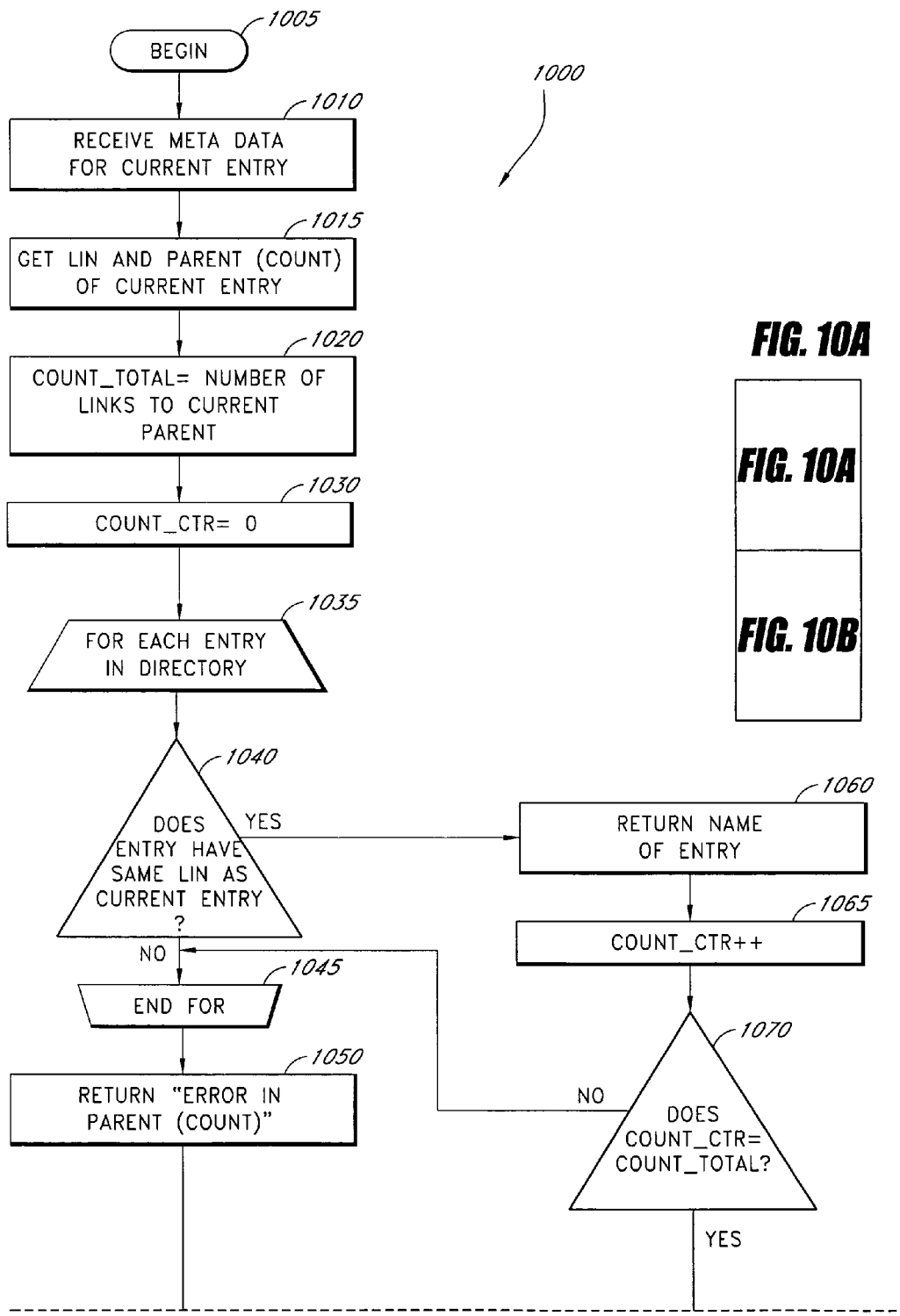

SYSTEMS AND METHODS OF REVERSE LOOKUP

FIELD OF THE INVENTION

This invention relates generally to performing a reverse lookup in a map data structure.

BACKGROUND

The increase in the amount of data stored on digital computing systems has resulted in complex storage systems with data often distributed over multiple physical nodes or storage devices. One method for organizing data has been to store them in files. These files are then grouped into directories with some directories including other directories and/or files. Typically, files and directories are assigned unique identifiers within the file system. In most systems, files and directories are arranged in order to optimize the lookup of a unique identifier given the particular path or name of the file or directory (such as for a downward lookup).

Examples of mapping structures used to organize files and directories in this manner include B-trees, B+trees, Patricia tries, red-black trees, and flat-file directories. However, these types of systems often make the lookup of the path in response to the unique identifier computationally expensive because an examination of many more nodes is required in order to identify the desired file or directory (such as for a reverse lookup).

Because of the foregoing challenges and limitations, there is a need to provide a more efficient manner in which to perform a reverse lookup in a map data structure.

SUMMARY OF THE INVENTION

The embodiments disclosed herein generally relate to performing a reverse lookup in a map data structure.

In one embodiment, a process for reverse lookups between a map structure and a structure being referenced by the map structure comprises receiving a structure that includes a reference to the structure and a reverse lookup hint; locating one or more entries in a map structure that correspond to the reverse lookup hint; and identifying at least one matching entry in the map structure that corresponds to the structure.

In another embodiment, a method for reverse lookups between a map structure and a structure being referenced by the map structure comprises storing in a map structure at least one reference to a structure and a name associated with the structure; and storing in the structure the at least one reference and a reverse lookup hint to locate the reference in the map structure.

In yet another embodiment, a data structure for reverse lookups comprises a reference to a data structure; and a reverse lookup hint to locate one or more entries in a map structure that correspond to the data structure, the one or more entries including the reference to the data structure and a name corresponding to the data structure.

In a further embodiment, a distributed file system configured to perform reverse lookups between a map structure and a structure being referenced by the map structure comprising an at least one storage device configured to store data. The data comprises a map structure which comprises a reference to a structure and at least one name associated with the structure; and the structure which comprises the reference and a reverse lookup hint that is used to locate the reference to the structure in the map structure.

For purposes of summarizing this invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIGS. 6A-I illustrate one embodiment of the elements of an inode data structure in a file system.

DETAILED DESCRIPTION OF PREFERRED EMBODIMENTS

Figure 1:
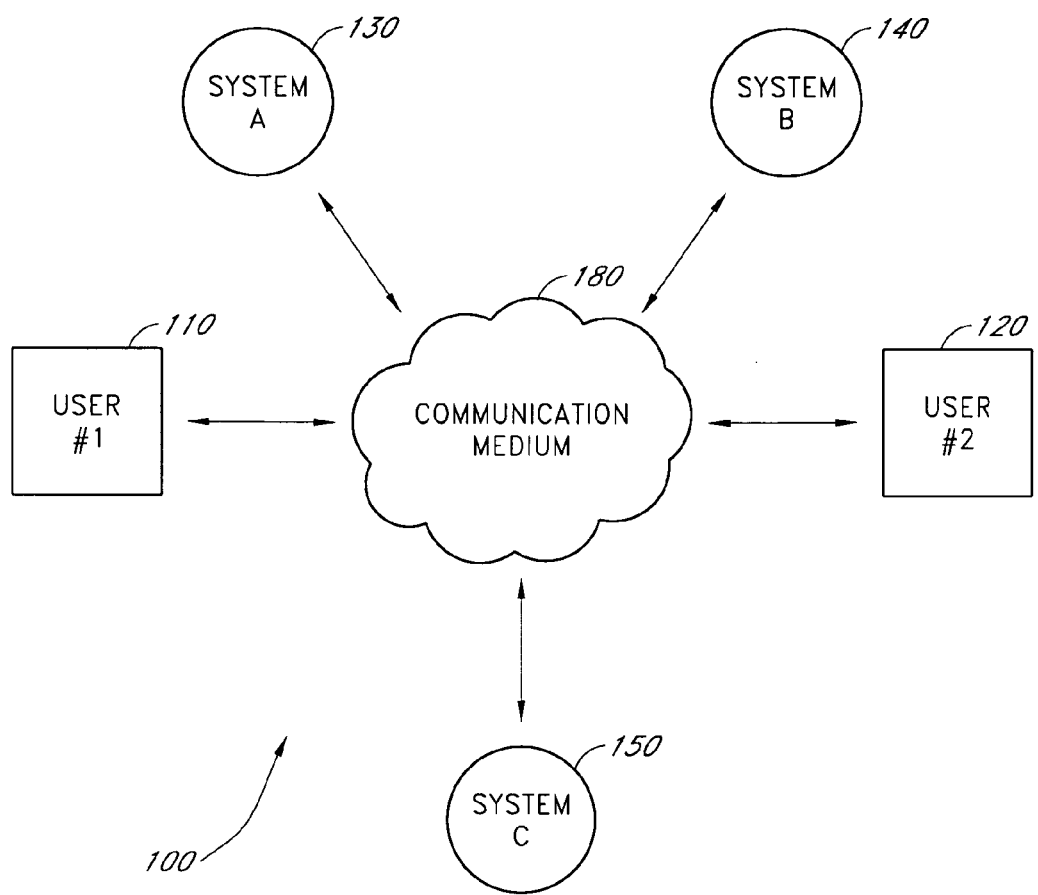
FIG. 1 illustrates one embodiment of the connections of physical nodes in one embodiment of a distributed file system.

Systems, methods, processes, and data structures which represent one embodiment of an example application of the invention will now be described with reference to the drawings. Variations to the systems, methods, processes, and data structures which represent other embodiments will also be described.

For purposes of illustration, some embodiments will be described in the context of a distributed file system. Embodiments of a distributed file system suitable for accommodating reverse lookup requests are disclosed in U.S. patent application Ser. No. 10/007,003, titled, "SYSTEMS AND METHODS FOR PROVIDING A DISTRIBUTED FILE SYSTEM UTILIZING METADATA TO TRACK INFORMATION ABOUT DATA STORED THROUGHOUT THE SYSTEM," filed Nov. 9, 2001 which claims priority to Application No. 60/309,803 filed Aug. 3, 2001, U.S. patent application Ser. No. 10/281,467 entitled "SYSTEMS AND METHODS FOR PROVIDING A DISTRIBUTED FILE SYSTEM INCORPORATING A VIRTUAL HOT SPARE," filed Oct. 25, 2002, and U.S. patent application Ser. No. 10/714,326 entitled "SYSTEMS AND METHODS FOR RESTRIPING FILES IN A DISTRIBUTED FILE SYSTEM," filed Nov. 14, 2003, which claims priority to Application No. 60/426,464, filed Nov. 14, 2002, all of which are hereby incorporated by reference herein in their entirety.

In one embodiment of a distributed file system, metadata structures, also referred to as inodes, are used to monitor and manipulate the files and directories within the system. An inode is a data structure that describes a file or directory and may be stored in a variety of locations including on disk and/or in memory. The inode in-memory may include a copy of the on-disk data plus additional data used by the system, including fields associated with the data structure.

Some of the figures and descriptions relate to an embodiment of the invention wherein the environment is that of a distributed file system. The present invention is not limited by the type of environment in which the systems, methods, structures, and processes are used, however, and may be used in other environments, such as, for example, other file systems, other distributed systems, the Internet, the World Wide Web, a private network for a hospital, a broadcast network for a government agency, an internal network of a corporate enterprise, an Internet, a local area network, a wide area network, a wired network, a wireless network, and so forth. It is also recognized that in other embodiments, the systems, methods, structures and processes may be implemented as a single module and/or implemented in conjunction with a variety of other modules and the like.

I. Overview

In one embodiment, a user or client device is connected to a distributed file system comprised of one or more physical nodes (for example, storage devices). The data on each of the physical nodes are arranged according to inodes which store metadata about files and directories within the file system. Typically, when a client device desires to access a specific file stored on the distributed file system, the client device requests the file by its name or some other mutable identifier. Then, the system performs a downward lookup in order to identify the inode that corresponds to the file.

As used herein, a file is a collection of data stored in one unit under an inode or filename. A directory, similar to a file, is a collection of data stored in one unit under an inode or directory name. A directory, however, is a specialized collection of data regarding elements in a file system. In one embodiment, a file system is organized in a tree-like structure. Directories are organized like the branches of trees. Directories may begin with a root directory and/or may include other branching directories. Files resemble the leaves or the fruit of the tree. Files, typically, do not include other elements in the file system, such as files and directories. In other words, files do not typically branch. Although in the illustrated embodiment an inode represents either a file or a directory, in other embodiments, an inode may include metadata for other elements in a distributed file system, in other distributed systems, in other file systems, or other systems.

Some client devices may dispatch a listener that awaits event notifications on a particular inode. In one embodiment, event notifications may be generated and received according to the systems and methods disclosed in U.S. patent application Ser. No. 11/396,282, titled, "SYSTEMS AND METHODS FOR NOTIFYING LISTENERS OF EVENTS," and is hereby incorporated by reference in its entirety. For example, the client may be a directory management application. When the directory management application opens a window on a particular directory, it instantiates a listener on that directory. When another application, such as a word processor, creates a new file in that directory, the event system notifies the listening application, which updates the window to show the new file.

When an event notification system receives a notification on a particular inode, it returns the unique identifier that corresponds to the inode. Thus, in order to communicate the name or global path to a user or client application, a reverse lookup is needed. It is also recognized that the need for a name associated with an inode may arise in a variety of other contexts.

The embodiments disclosed herein may be implemented on a file system that includes directories represented by a map data structure, where each map data structure may include billions of entries. In some implementations, the systems and methods, structures and processes for a reverse lookup disclosed herein may dramatically reduce the time required to identify the name associated with files and directories and thereby improve overall system efficiency.

II. System Architecture

In FIG. 1, a distributed file system 100 comprises various physical nodes 110, 120, 130, 140, 150 that communicate over a communication medium 180. In one embodiment, the communication medium 180 is the World Wide Web. In other embodiments, as described above, the distributed file system 100 may be comprised of a direct hard-wired connection between the physical nodes or any combination of communication types.

In the embodiment depicted, the physical nodes are either interfaces 110, 120, such as a personal computer, a mainframe terminal or a client application, or data storage systems 130, 140, 150. It will be appreciated by one with ordinary skill in the art that the distributed file system 100 may comprise one or a plurality of interfaces and one or a plurality of data storage systems. In some embodiments, the interfaces 110, 120 may comprise data storage systems such as, for example, data storage systems 130, 140 and 150.

Figure 2A:
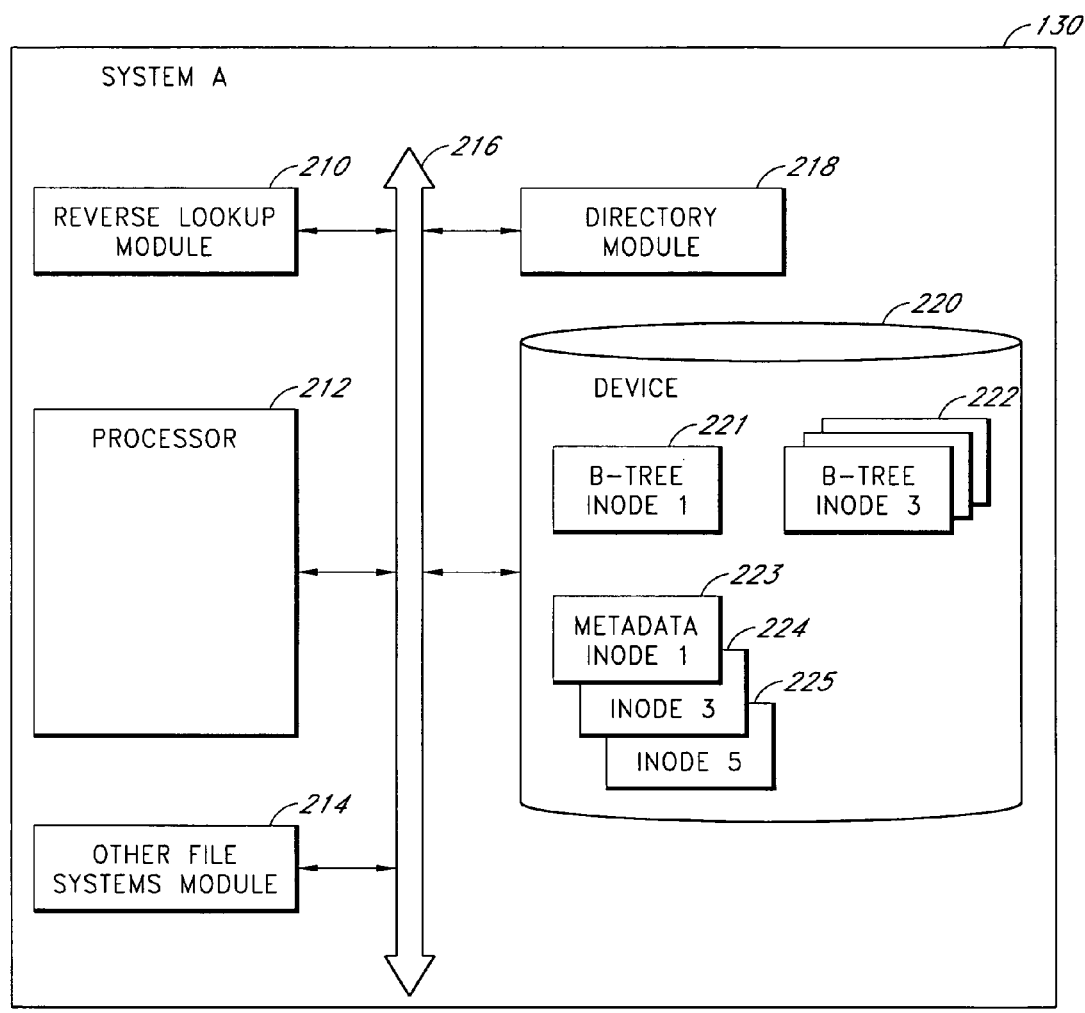
FIGS. 2A-C illustrate one embodiment of physical nodes on a distributed file system.
Figure 2B:
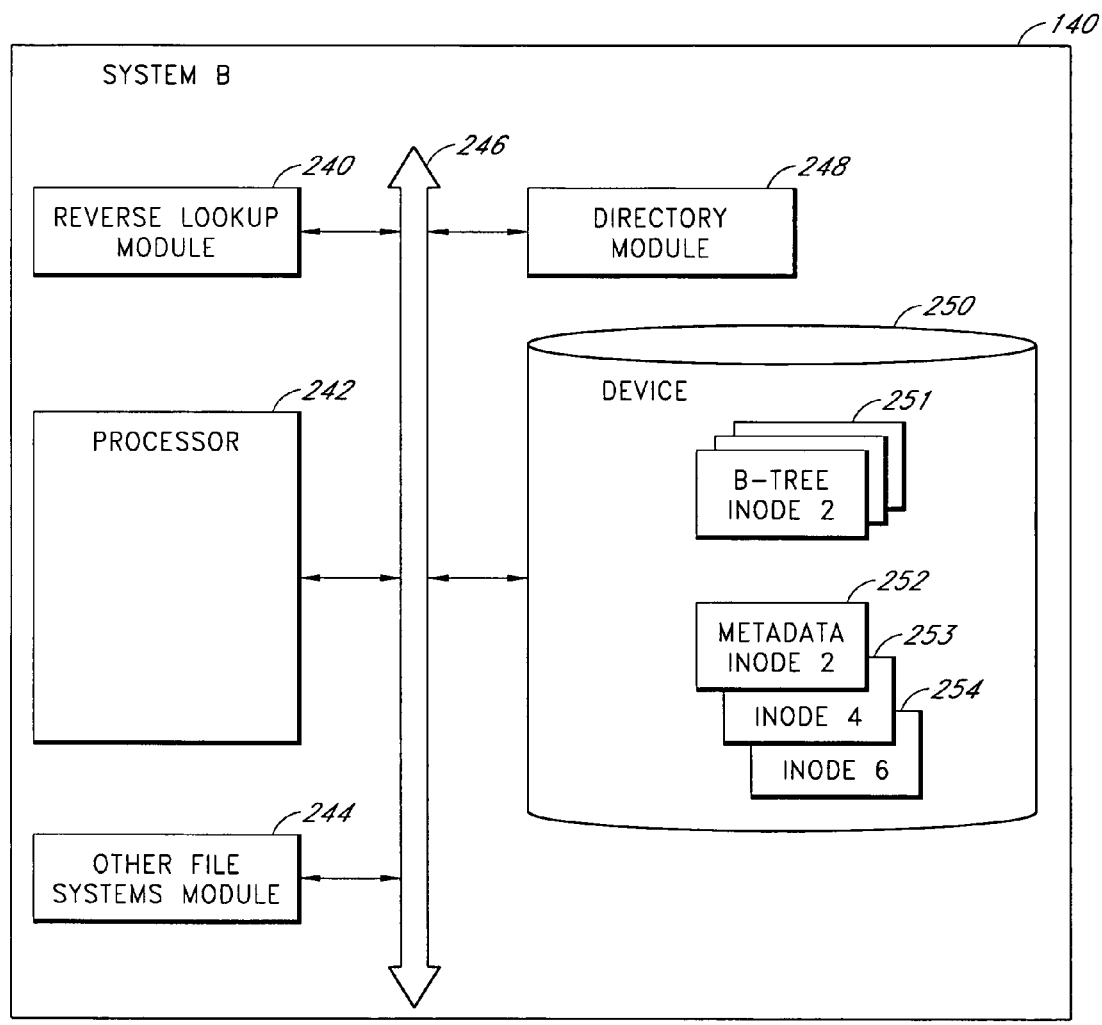
Figure 2C:
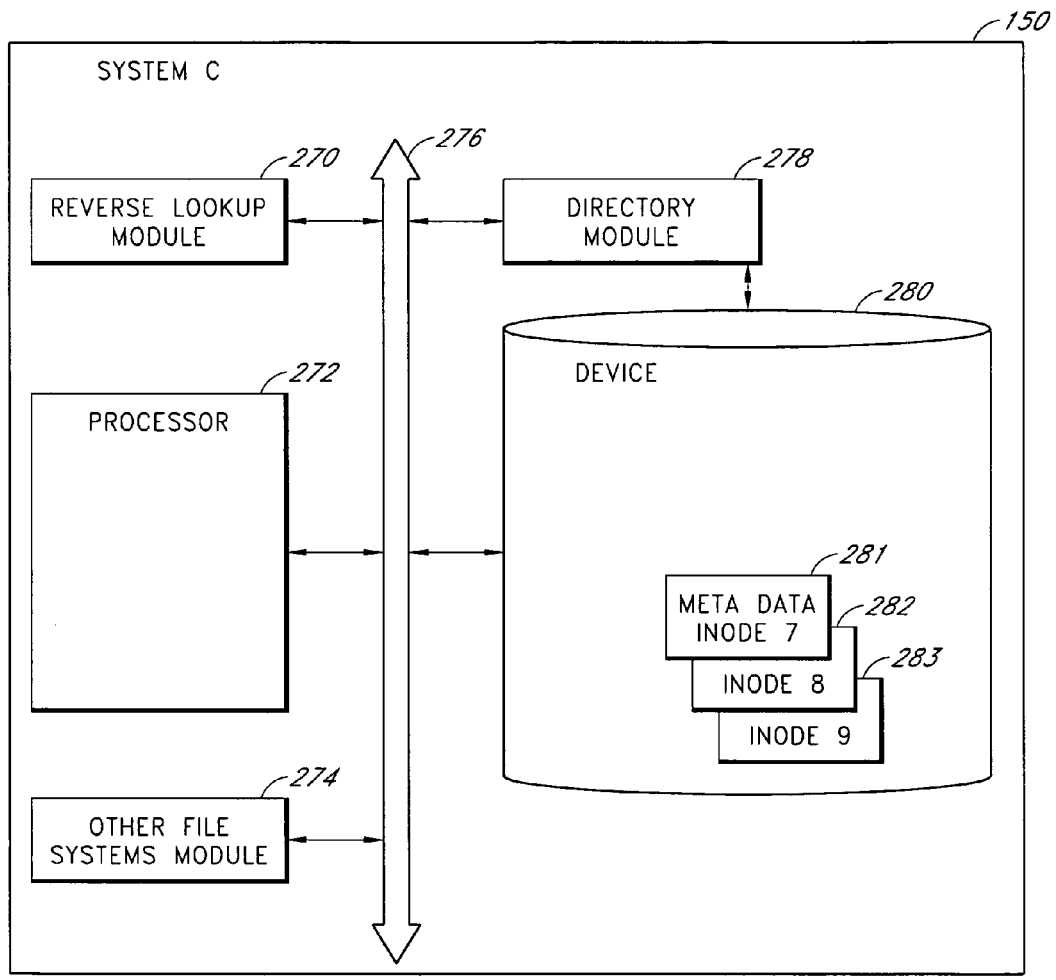

FIGS. 2A-C illustrate one embodiment of the data storage systems 130, 140, 150 of the distributed file system. Each of the data storage systems 130, 140, 150 comprise several subcomponents which may include, for example, a reverse lookup module 210, 240, 270; a processor 212, 242, 272; a directory module 218, 248, 278; a storage device 220, 250, 280; and an other file systems module 214, 244, 274. In some embodiments, these subcomponents communicate with one another over a bus 216, 246, 276. In other embodiments, the data storage systems may include only a portion of the depicted subcomponents or only the storage devices 220, 250, 280. In yet other embodiments, one of the storage device systems 130, 140, 150 comprise subcomponents not found in the other storage device systems 130, 140, 150.

As used herein, the word module refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Moreover, although in some embodiments a module may be separately compiled, in other embodiments a module may represent a subset of instructions of a separately compiled program, and may not have an interface available to other logical program units.

In one embodiment, the directory module 218, 248, 278 assigns to each link between inodes a key. The key serves as a unique identifier within a particular directory map structure. When the processor 212, 242, 272 receives an event notification related to an inode, the processor 212, 242, 272 communicates the relevant inode identifier or LIN to the reverse lookup module 210, 240, 270. The reverse lookup module 210, 240, 270 accesses the storage device 220, 250, 280 in order to efficiently perform the reverse lookup operation in the particular directory map structure and return the name associated with the link(s) to the inode.

Figure 5:
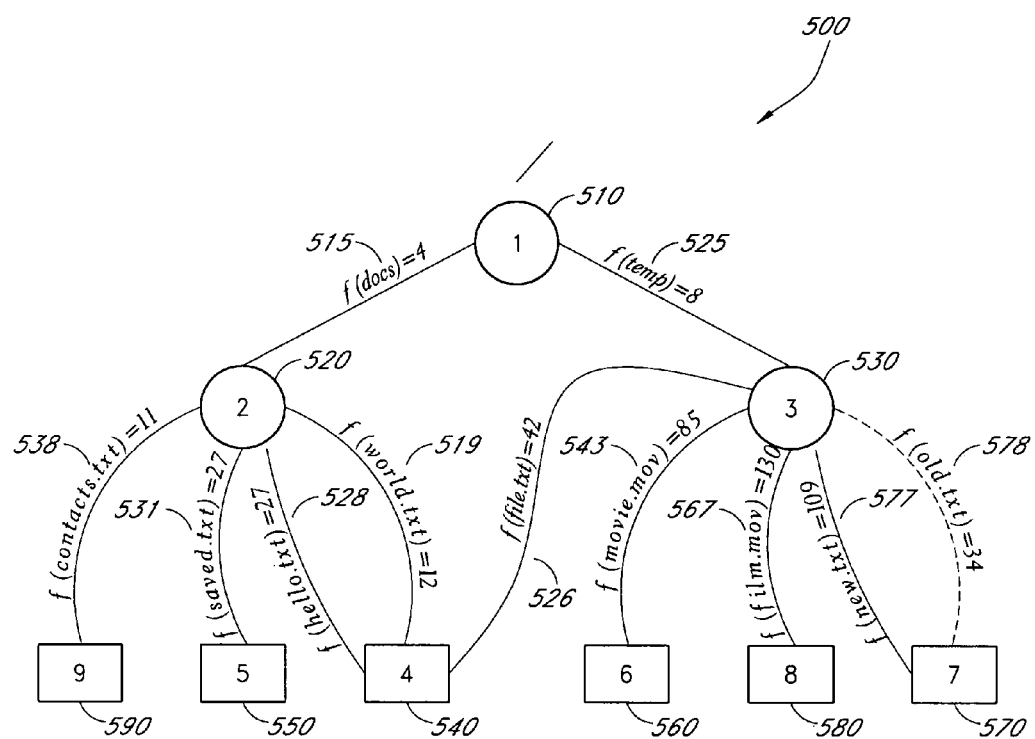
FIG. 5 illustrates one embodiment of logical connections of one embodiment of inodes in a distributed file system.
Figure 6A:
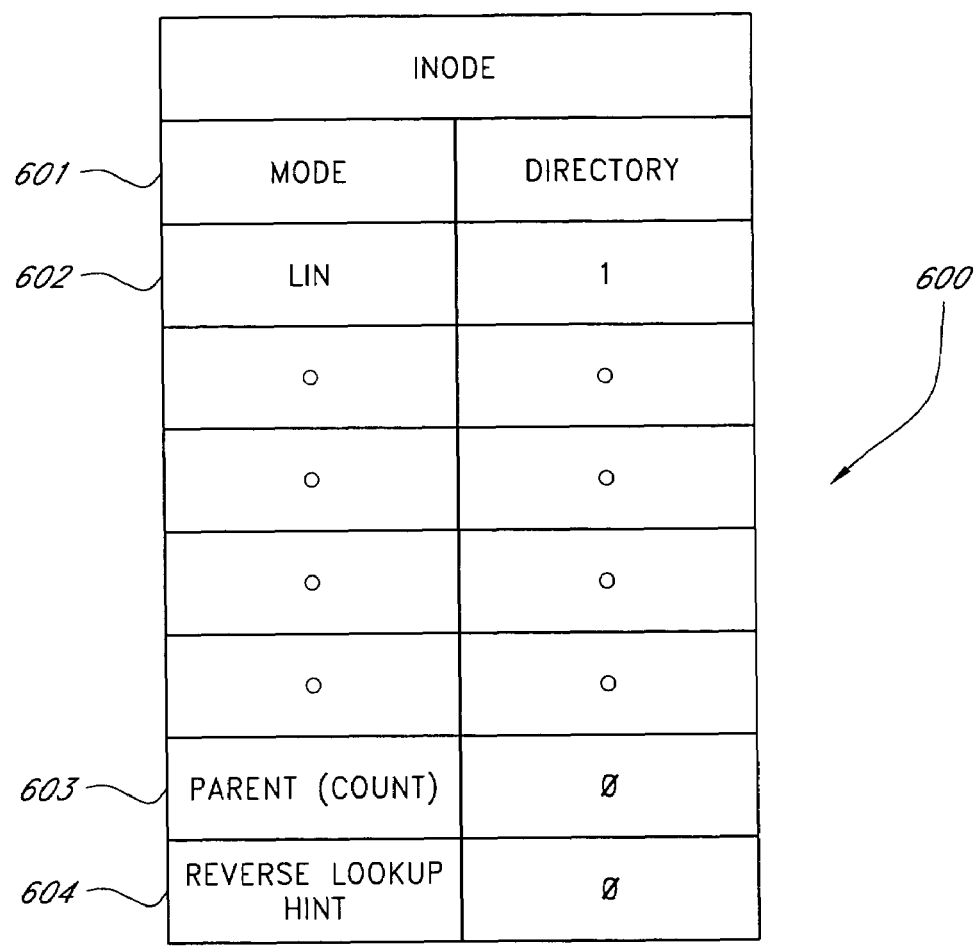

The data structures stored in the storage devices 220, 250, 280 correspond to, by way of example only, the inode arrangement depicted in FIG. 5. For each inode in the distributed file system 100, metadata for the inodes are stored on at least one storage device 220, 250, 280. For example, storage device 220 stores metadata for inodes one 510, three 530 and five 50; storage device 250 stores metadata for inodes two 520, four 540 and six 560; and storage device 280 stores metadata for inodes seven 570, eight 580 and nine 590.

The data storage devices 220, 250, 280 also store a mapping data structure for every inode that corresponds to a directory in the distributed file system 100. In the embodiments described herein, the mapping structure is implemented using a B-tree structure. It will be appreciated by one of ordinary skill in the art, however, that other data structures may be used such as, for example, B+-trees, Patricia tries, red-black trees and flat-file directories. In the depicted embodiment, the number of B-tree blocks stored for each directory inode depend on the number of links stored in the B-tree, and the height of the B-tree depends upon the number of B-tree blocks. For example, as shown in FIGS. 2A-C and 7A-C, one block is stored in storage device 220 for inode one 510 because inode one 510 stores two links and thus has a single level B-tree 700; three blocks are stored in storage device 250 for inode two 520 because inode two 520 stores four links and has a two level B-tree 710; and three blocks are stored in storage device 220 for inode three 530 because inode three 530 stores four links and thus has a two level B-tree 720.

Data structures are collections of associated data elements, such as a group or set of variables or parameters. In one embodiment a structure may be implemented as a C-language "struct." One skilled in the art will appreciate that many suitable data structures may be used.

Figure 10B:
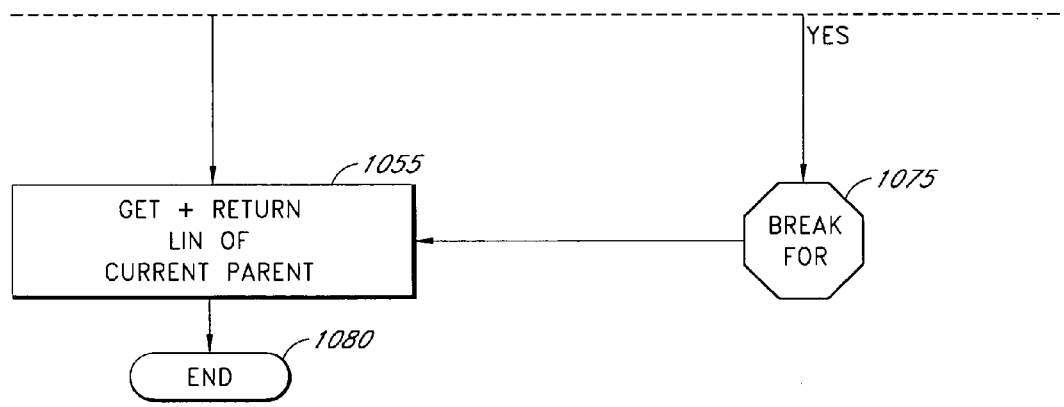
FIG. 10 illustrates one embodiment of a flowchart of operations for a subprocess of the reverse lookup operation directed to an inode that has more than one link to a single parent.

While FIG. 10 illustrates one embodiment of a reverse lookup operation, it is recognized that other embodiments may be used. For example, the inputs and outputs may be passed as a value, reference, and/or stored in an accessible memory location.

In one embodiment, the data storage systems 130, 140, 150 may run on a variety of computer systems such as, for example, a computer, a server, a smart storage unit, a mobile telephone, a handheld device, an embedded device, and so forth. In one embodiment, the computer may be a general purpose computer using one or more microprocessors, such as, for example, a Pentium® processor, a Pentium® II processor, a Pentium® Pro processor, a Pentium® IV processor, a Pentium® D processor, a Pentium® Core™ processor, an xx86 processor, an 8051 processor, a MIPS processor, a Power PC processor, a SPARC processor, an Alpha processor, and so forth. The computer may run a variety of operating systems that perform standard operating system functions such opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Microsoft® Windows® XP, Palm Pilot OS, Apple® MacOS®, Disk Operating System (DOS), UNIX, IRIX, Solaris, SunOS, FreeBSD, Linux®, or IBM® OS/2® operating systems.

III. Key Creation

Figure 3:
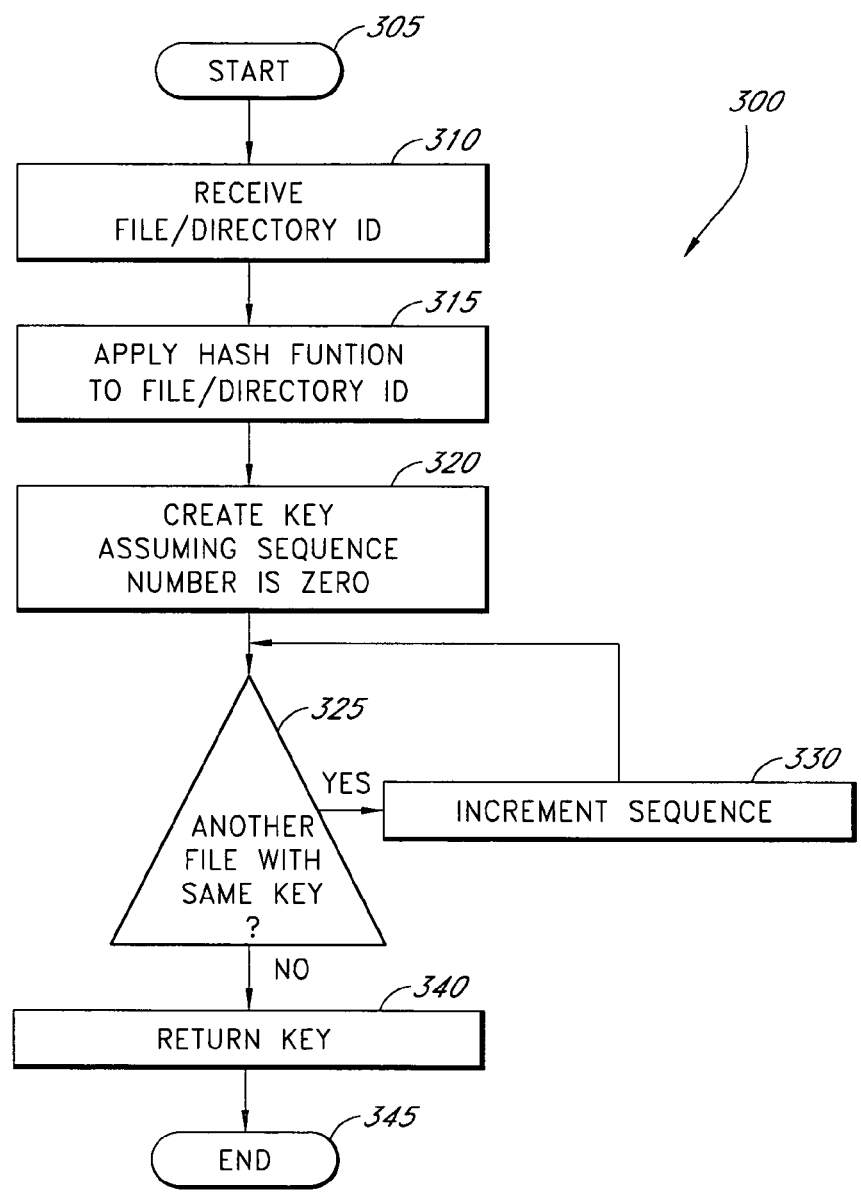
FIG. 3 illustrates one embodiment of a flow-chart of operations for creating a key based on the name of a file or a directory.
Figure 4:
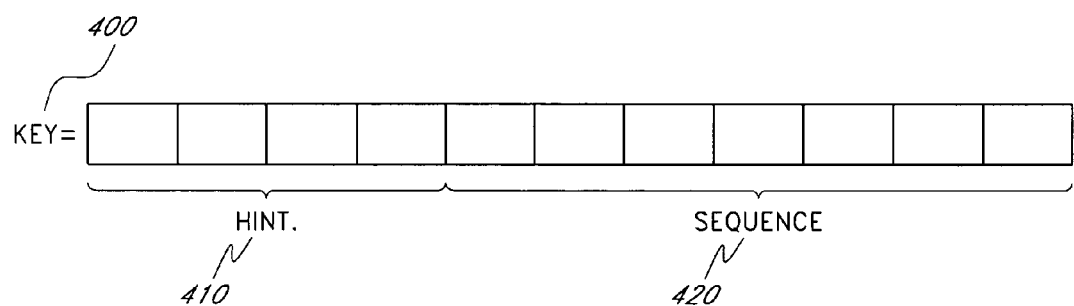
FIG. 4 illustrates one embodiment of a key that references an inode.

FIG. 3 illustrates one embodiment of a flow-chart of operations for creating a key based on the name of a file or a directory. In one embodiment, the operations included in FIG. 3 are carried out by directory modules 218, 248, 278 of FIGS. 2A-C. FIG. 4 illustrates one embodiment of a key 400 created by the flow-chart depicted in FIG. 3. Referring to FIG. 4, the key 400 comprises a hint 410 and a sequence number 420. The key 400 is a unique identifier within each directory map structure associated with each link to a file or directory in the distributed file system 100. The key 400 for each link is stored in the B-tree structure of the inode's parent(s).

Referring to FIG. 3, the method for creating the key starts 305 by receiving an identifier or name associated with a particular file or directory 310. Then, a hash function is applied to the identifier 315 so as to generate a hash value that is hereinafter referred to as the hint 410. In one embodiment, the hash function is a MOD function applied to the sum of the ASCII values that correspond to the letters comprising the identifier. A mod function determines the hash value by first dividing the input by a fixed divisor and then assigning to the hash value the remainder. A mathematical representation of a MOD function is shown below:

$$Hash\_Value = REM((Hash\_Input)/(Divisor))$$

For example, if the number 7 is used as the Divisor, the following table illustrates an example of Hash_Values that correspond to the following Hash_Inputs:

| Hash_Input | Hash_Value |
|---|---|
| 16 | 2 |
| 17 | 3 |
| 18 | 4 |
| 19 | 5 |
| 20 | 6 |
| 21 | 0 |
| 22 | 1 |
| 23 | 2 |
| 24 | 3 |
| 25 | 4 |
| 26 | 5 |
| 27 | 6 |
| 28 | 0 |
| 29 | 1 |
| 30 | 2 |
| 31 | 3 |

As shown, there is not a one-to-one correspondence between each Hash_Value and each Hash_Input. In other words, more than one file or directory name may hash to the same Hash_Value. The use of a hash function to provide the hint is advantageous. In particular, it is preferable for a distributed file systems to store a key that comprises the hint rather than the name of a file or directory because the key is smaller than a filename and is of a fixed size. Additionally, in other embodiments, the hash function may use a different divisor such as 3, 87, 859 or 7,877. In yet other embodiments, the hash function may be the same as or similar to those disclosed in Knuth, D., The Art Of Computer Programming, Vol. 3: Sorting and Searching, Chap. 6.4 (Addison Wesley 1973) which is hereby incorporated by reference in its entirety herein. In further embodiments, the hint may be created using another function known to one with ordinary skill in the art of hash-based data structures.

After the hint is created, the method creates a key 400 with a default number of zero 320. In the embodiment depicted in FIG. 4, the key 400 is represented by a binary number. In that embodiment, the most significant bits are populated by the hint 410 and the remaining least significant bits are populated by the sequence number 420. In this embodiment, the key is represented by an eleven bit binary value. The hint 410 is represented by a four bit binary value, and the sequence number 420 is represented by a seven bit binary value. Thus, in step 320, the key 400 is initially created with the sequence number "0000000."

In other embodiments, the key 400, hint 410, and sequence number 420 may be represented by more or fewer binary bits, be represented by hexadecimal digits, ASCII characters, and so forth. In yet other embodiments, the key may additionally be comprised of values other than and/or in addition to those that correspond to the hint and sequence number. For ease of reference, a specific key value will be referred to herein using the following convention: (Hint, Sequence_Number).

In step 325, a lookup operation is performed to determine if another link from the parent has been assigned the same key as the one created in step 320. If no links have the same key 400 as the one created in step 320, the method returns the key 400 in step 340 before ending 345.

However, if another link in the parent directory has the same key 400 as the one created in step 320, the sequence number 420 is incremented in step 330. After incrementing the sequence number 420, step 325 is repeated to determine if another link in the parent directory 100 has the new key 400. If one exists, the sequence number 420 is incremented 330 until the key 400 assigned to the link is a unique key 400 within the parent directory 100.

For example, suppose Files A, B, C, and D are created in the recited order and are the first files created in a given directory. Also suppose that the links to Files A-D correspond to Hash_ Values 2, 6, 2, and 2, respectively. For the link to File A, the key is (2,0) because the Hash_Value is 2 and no other files exist on the system with the same key. For the link to File B, the key is (6,0) because the Hash_Value is 6 and no other files exist on the system with the same key. For the link to File C, the key will begin as (2,0) because the Hash_Value is 2 and the sequence number is initialized to zero. However, because the link to File A has the same key, the sequence number will be incremented. Consequently, the key assigned to the link to File C will be (2,1) because no other links from the parent directory have the same key. For the link to File D, the key will begin as (2,0) because the Hash_Value is 2 and the sequence number is initialized to zero. However, because the link to File A has the same key, the sequence number will be incremented such that the key is (2,1). The system will then increment the sequence number again because the link to File C has the same key. Therefore, the key (2,2) is assigned to the link to File D.

While FIG. 3 illustrates one embodiment of a method for creating a key, it is recognized that other embodiments may be used. For example, in other embodiments, a count can be stored for each potential hash value which tracks the number of links to files/directories that have the same hash value such that a lookup of the count is performed. In another embodiment, the key and/or identifier, may be stored in a memory location accessible by other modules such that the key does not have to be returned.

It is recognized that in other embodiments, the key may be created without the use of a hash function. In yet other embodiments, keys may be assigned without the use of a sequence number.

IV. Inode Arrangement

FIG. 5 illustrates one example of logical connections of one embodiment of inodes in a storage system. Conceptually, as described above, the inodes of FIG. 5 are arranged as a tree. The tree depicted in FIG. 5 has three levels with inode one 510 comprising the first level, inodes two 520 and three 530 comprising the second level, and inodes four through nine 540, 550, 560, 570, 580, 590 comprising the third level. As shown, the inodes represented by a circle 510, 520, 530 correspond to directories in the system 100, and inodes represented by a rectangle 540, 550, 560, 570, 580, 590 correspond to files in the system 100. It will be appreciated by one with skill in the art that inodes may be arranged with more or fewer levels and may also include any number of inodes such as 1, 8, or 10,000 inodes.

Inode one 510 is the top-most directory in the system and in the embodiment of a file system is referred to as the root directory. Inode one 510 has two child inodes, inodes two 520 and three 530, and six grandchild inodes, inodes four through nine 540, 550, 560, 570, 580, 590. Inode one 510 will be referred to as the parent of inodes two 520 and three 530, and the grandparent of inodes four through nine 540, 550, 560, 570, 580, 590.

As a parent inode, inode one 510 references its children. In the depicted example, it references inode two 520 via pointer 515 and references inode three 530 via pointer 525. The name associated with the link to inode two 520, "docs," is noted alongside pointer 515. Also indicated is the reverse lookup hint associated with and derived from the name of the link to inode two 520, "4." Accordingly, the global path for inode two 520 is "/docs". In one embodiment, the metadata for an inode includes information about each of the inode's parent(s). For example, the metadata stores a Parent(Count) that indicates the LINs of each parent of the inode and the number of links to each parent. In some embodiments, this information may include the inode's full path name(s), however, storing and updating this information can be time consuming. Thus, in some embodiments, the inodes store information, such as for example, a "reverse lookup hint" that allows the system to determining the inode's path name(s).

As used herein, a "reverse lookup hint" is associated with each name of, or synonymously, each link to, an inode. As described above, the hint may be the hash value of the name of the corresponding file or directory. Thus, there is a hint and a reverse lookup hint for each existing link to an inode. In some embodiments, the reverse lookup hint may be one of the hints, the hint plus a portion of the sequence number, a portion of the hint, the hint and the sequence number, the key, or an arbitrarily assigned value.

A "reverse lookup hint" is used to narrow the search range during reverse lookup operations. In one embodiment, the reverse lookup hint refers to the hint associated with the first-created link to an inode. That is, if the link that corresponds to the reverse lookup hint is later destroyed, the reverse lookup hint stored in the inode's metadata structure will nonetheless remain unchanged. In other embodiments, however, the reverse lookup hint may change in response to destroyed or newly created links. In yet other embodiments, inodes may store reverse lookup hints associated with the last created link to the inode, every link to the inode, a subset of every link to the inode, every parent of the inode, or only some of the parents of the inode.

As indicated above, inode two 520 has three children. Pointers 519, 528, 531 and 538 point to each of the child inodes. Because the children 540, 550, 590 of inode two 520 are files, they do not have any children. Thus, they may also be referred to as leaf inodes.

In the embodiment depicted in FIG. 5, directory inodes may only be singly linked to only one parent inode, but leaf inodes may be multiply linked to one or more parent inodes. For example, inode four 540 is multiply linked to inode two 520. That is, inode two 520 has two pointers 519, 528 that point to inode four 540. Additionally, inode three 530 is also a parent of inode four 540 via pointer 526. Consequently, inode four 540 has three names in the distributed file system 100: "hello.txt", "world.txt", and "file.txt". Accordingly, inode four 540 also has three global paths: "/docs/hello.txt", "/docs/world.txt", and "/temp/file.txt".

In another embodiment, leaf inodes may only be linked from a single parent inode. In other embodiments, a directory inode may be multiply linked from its parent inodes. In yet other embodiments, directories may be linked from more than one parent inode and/or files may have child inodes.

The following table summarizes the inode arrangement depicted in FIG. 5:

| Parent Inode | Child Inode | Hint | Name of Child Inode | Global Path of Child Inode |
|---|---|---|---|---|
| 1 | 2 | 4 | docs | /docs |
| 1 | 3 | 8 | temp | /temp |
| 2 | 4 | 12 | world.txt | /docs/world.txt |
| 2 | 4 | 27 | hello.txt | /docs/hello.txt |
| 2 | 5 | 27 | saved.txt | /docs/saved.txt |
| 2 | 9 | 11 | contacts.txt | /docs/contacts.txt |
| 3 | 4 | 42 | file.txt | /temp/file.txt |
| 3 | 6 | 85 | movie.mov | /temp/movie.mov |
| 3 | 7 | 34 | old.txt | /temp/old.txt |
| 3 | 7 | 109 | new.txt | /temp/new.txt |
| 3 | 8 | 130 | film.mov | /temp/film.mov |

FIG. 5 shows a hint collision for inodes four 540 and five 550. That is, the names "saved.txt" and "hello.txt" both hash to a hint of 27. In order to resolve the collision, the keys associated with hello.txt and saved.txt differ by their sequence numbers. Accordingly, the key for hello.txt is (27, 0), and the key for saved.txt is (27,1).

Additionally, inode three 530 points to inode seven 570 via pointer 577. As indicated by the dashed line, inode three 530 initially pointed to inode seven 570 via pointer 578. However, that link 578 was destroyed. In the illustrated embodiment, the reverse lookup hint assigned to an inode corresponds to the first-created link to that inode. Accordingly, because the link to inode seven 570 via pointer 578 was created before the link indicated by pointer 577, the reverse lookup hint for inode seven 570 remains 34. As used herein, when the reverse lookup hint to an inode does not correspond to an existing link to that inode, it is referred to as a "stale hint." In other embodiments, the distributed file system 100 updates the reverse lookup hint every time a link is destroyed so as to eliminate stale hints.

V. Metadata

FIGS. 6A-I illustrate one embodiment of the elements of an inode data structure in a file system. As used herein, the elements associated with each inode data structure is referred to as metadata. By way of example only, the metadata structures shown in FIGS. 6A-I correspond to the inode arrangement depicted in FIG. 5.

The metadata structure comprises a plurality of fields that include information about the inode. For example, fields in inode 600 may include, but are not limited to, the mode 601; the LIN 602; an array of parents, each indicating the number of links from that parent, referred to as the "Parent (Count)" 603; and the reverse lookup hint 604.

The mode field 601 indicates, for example, whether the inode corresponds to a file or a directory.

The LIN field 602, or Logical Inode Number field, refers to a unique identifier for the file or directory. It uniquely refers to the on-disk data structures for the file or directory. For inode one 510, the LIN is 1. As used herein, inodes are referred to using their LIN.

The Parent (Count) field 602 refers to the parents of the inode and the number of links, that is, counts, from each parent. For example, inode one 510 has no parents because it is the root-directory. Accordingly, a null value is stored in the Parent (Count) 602 field. In other embodiments, a zero value or another value may be stored in the Parent (Count) field 602 of the root inode 510.

However, inode four 540 has two parents, inodes two 520 and three 530, and is multiply linked from parent inode two 520. Therefore, the value stored in the Parent (Count) field 633 of metadata structure 630 is "2(2), 3(1)." The value stored in Parent (Count) field 633 indicates that inode four 540 has two links from parent inode two 520 and one link from parent inode three 530. It will be recognized by one with skill in the art that the Parent (Count) value may be stored in any number of ways such as, for example, a binary representation, a linked list, or an array.

Also, for inode seven 570, the value stored in the Parent (Count) field 663 of metadata structure 660 is "3(1)." The value stored in Parent (Count) field 660 indicates that only one link exists between inode three 530 and inode seven 540. In other words, the Parent (Count) field 663 reflects that the link associated with pointer 578 was destroyed.

The reverse lookup hint field 603 refers to the hint used by the reverse lookup operation to identify the name associated with a particular inode. For exemplary inode one 510, a null value is stored in the reverse lookup hint field 604 because inode one 510 is the root directory. In other embodiments, the reverse lookup hint may be a zero or a value representative of the root directory. For the other inodes, the reverse lookup hint corresponds to the hint associated with the first-created link to the inode.

For example, the value stored in the reverse lookup hint field 634 for inode four 540 is 27 because the link indicated by pointer 528 was created before the links indicated by pointers 519 and 526. Additionally, the value stored in the reverse lookup hint field 664 for inode seven 570 is 34 because it is a stale hint corresponding to the first-created and subsequently destroyed link indicated by pointer 578. As stated above, because the depicted embodiment does not update the reverse lookup hint in response to destroyed links, the reverse lookup hint remains 34 even though the hint associated with the only existing link is 109. Though updating the hint in response to destroyed links is computationally expensive, some embodiments may do so.

The following table summarizes a portion of the data stored in metadata structures 600, 610, 620, 630, 640, 650, 660, 670, and 680:

| Mode | Directory | Directory | Directory | File | File | File | File | File | File |
|---|---|---|---|---|---|---|---|---|---|
| LIN | 1 | 2 | 3 | 4 | 5 | 6 | 7 | 8 | 9 |
| Parent (Count) | Ø | 1(1) | 1(1) | 2(2), 3(1) | 2(1) | 3(1) | 3(1) | 3(1) | 2(1) |
| Reverse Lookup Hint | Ø | 4 | 8 | 27 | 27 | 85 | 34 | 130 | 11 |

VI. Mapping Structures

Figures 7A, 7B:
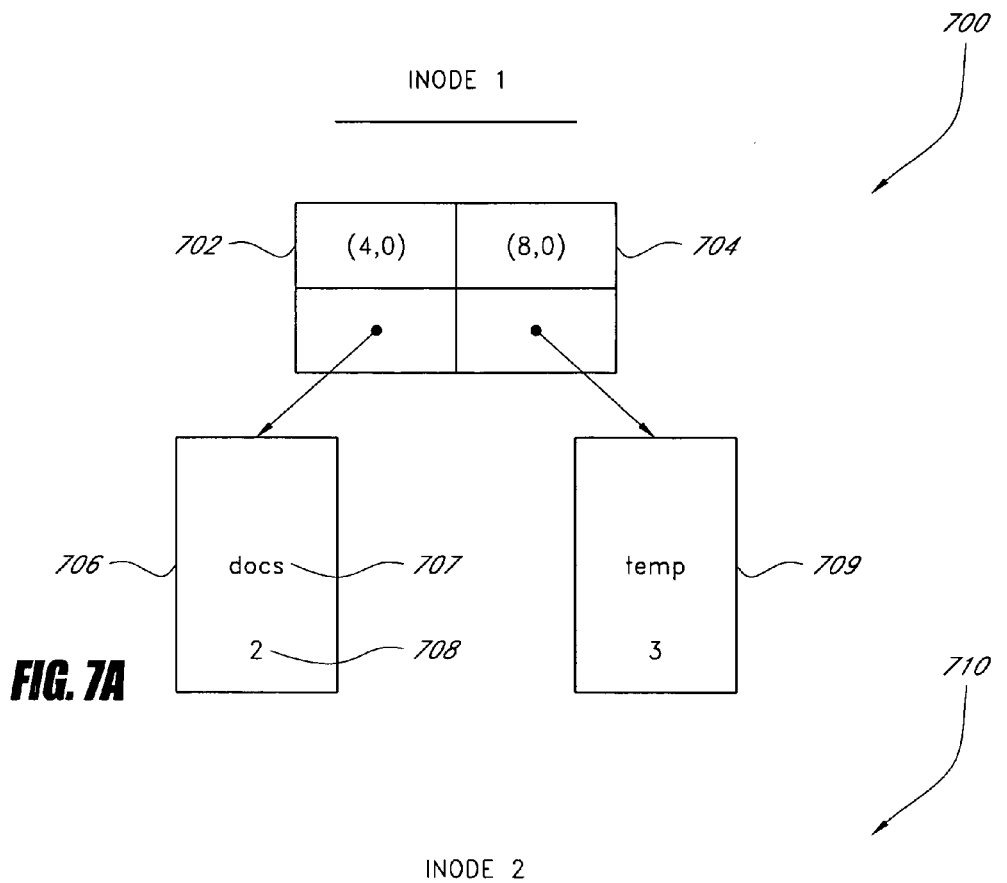
FIGS. 7A-C illustrate one embodiment of a mapping structure that corresponds to directory inodes.
Figure 7C:
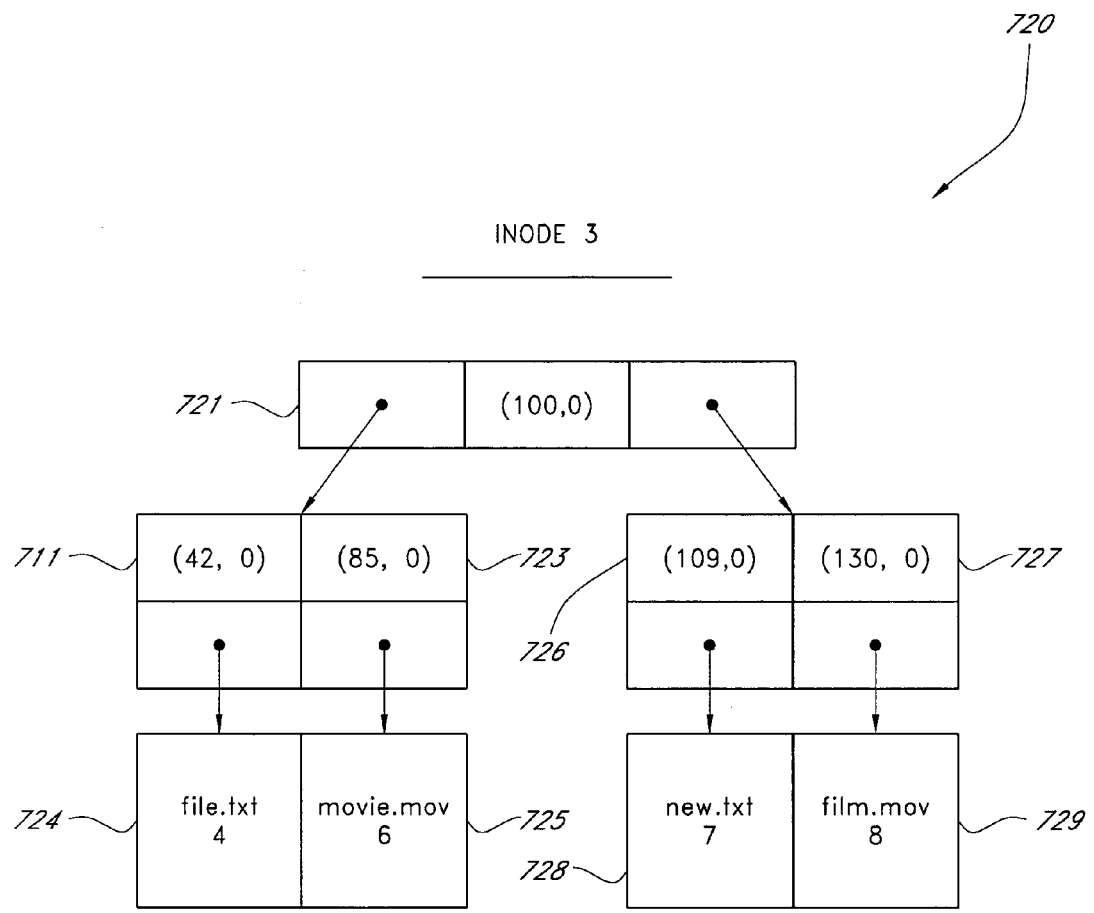

FIGS. 7A-C illustrate one embodiment of a mapping structure that corresponds to the logical connections of inodes one 510, two 520, and three 530 depicted in FIG. 5. The illustrated mapping structures correspond to a B-tree implementation. As indicated above, a person with ordinary skill in the art will recognize that other mapping structures are suitable for storing information relating to linked inodes in a distributed file system.

FIG. 7A illustrates the B-tree structure 700 that corresponds to inode one 510. B-tree structure 700 is implemented as a single level B-tree because it has only two leaf entries 702, 704. The leaf entries 702, 704 store the key associated with the links to the inodes 520, 530 that the actual entries 706, 709 reference. The actual entries 706, 709 store the name and LIN that correspond to the links to the child inodes. For example, the B-tree structure 700 for inode one 510 stores the key 702 associated with the link to inode two 520, (4,0), and stores the key 704 associated with the link to inode three 530, (8,0), in the leaf entries. Accordingly, the actual entry 706 for the link to inode two 520 stores the name "docs" 707 and the LIN "2." Similarly, actual entry 709 stores the corresponding information for the link to inode three 530.

FIG. 7B illustrates the B-tree structure 710 that corresponds to inode two 520. B-tree structure 710 is implemented as a two level B-tree because it has four leaf entries 711, 712, 715, 716 that point to corresponding actual entries 713, 714, 717, 718. The first level 719 stores pointers to the second level of the B-tree. Because of the balanced nature of the B-tree, the two entries 711, 712 with keys that are less than key (18, 0) are stored on the one side of the B-tree structure 710, and the two entries 715, 716 with keys greater than or equal to key (18,0) are stored on the other side of the of the B-tree structure 710. Additionally, leaf entries 715, 716 illustrate the importance of storing the full key in the leaf entries because when a hint collision occurs (for example, hello.txt and saved.txt both have a hint of 27), the sequence number is used to distinguish between the entries (for example, the sequence number for hello.txt is 0, and the sequence number of saved.txt is 1).

FIG. 7C illustrates the B-tree structure 720 that corresponds to inode three 530. B-tree structure 720 is implemented as a two level B-tree because it has four leaf entries 722, 723, 726, 727 that point to corresponding actual entries 724, 725, 728, 729. In contrast to the reverse lookup hint value stored in metadata structure 660, the key stored in the leaf entry 726 corresponds to the key associated with pointer 577. Therefore, even though the metadata structure 660 for inode seven 570 stores a stale hint, the reverse lookup operation will be able to identify the name associated with inode seven 570 using the key stored in leaf entry 726.

VII. Reverse Lookup

Figure 8:
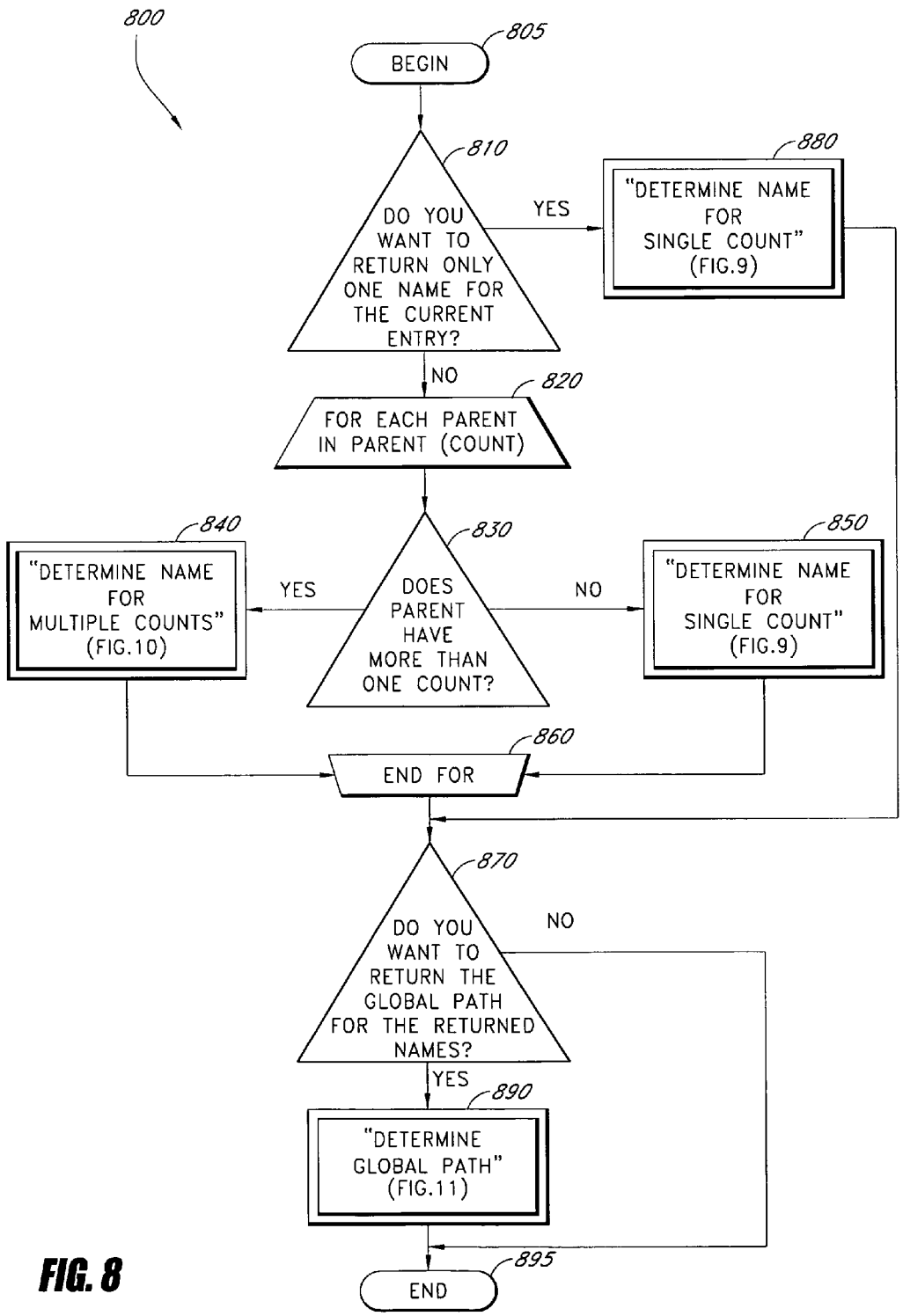
FIG. 8 illustrates one embodiment of a top-level flowchart of operations for performing a reverse lookup operation.

FIG. 8 illustrates one embodiment of a top-level flowchart of operations for performing a reverse lookup operation 800 for an inode. The reverse lookup operation 800 begins 805 by querying a user or client application as to whether only one name associated with the current entry or all names associated with the current entry are desired 810. In other embodiments, the system may, by default, return only one name, a predetermined number of names, a random number of names, or all names associated with the current entry. As used herein, "current entry" refers to the inode that is the subject of the reverse lookup operation 800 or one of its subprocesses 900, 1000, 1100.

If the user wishes to return only one name for the current entry in decision block 810, the reverse lookup operation calls, in block 880, subprocess "Determine Name for Single Count" 900 which will be described in more detail below. Subprocess "Determine Name for Single Count" 900 returns one name associated with a link to the current entry. Next, in decision block 870, the reverse lookup operation queries the user or client application as to whether the global path for the link to the current entry is desired.

If the global path is not desired, the operation ends 895.

However, if the global path is desired, the reverse lookup operation 800 calls subprocess "Determine Global Path" 1100 in block. 890. Subprocess "Determine Global Path" 1100 is described in more detail below. After returning the global path, the reverse lookup operation ends 895.

If, however, in block 810, all names associated with the current entry are desired, the reverse lookup operation 800 performs a for loop for each parent in the Parent (Count) of the current entry 820. For each parent, the reverse lookup operation 800 determines in decision block 830 whether the particular parent has more than one count. If the parent has more than one count, the reverse lookup operation 800 calls subprocess "Determine Name for Multiple Counts" 1000 in block 840. "Determine Name for Multiple Counts" 1000 returns the name for each link between the current entry and the particular parent of the current entry. However, if the parent has only one count, the reverse lookup operation 800 calls subprocess "Determine Name for Single Count" 900 in block 850. As stated above, "Determine Name for Single Count" 900 returns the name of the single link between the current entry and the parent of the current entry. After the names for every link to every parent have been returned, the for loop ends 860

Next, in decision block 870, the user or client application is queried as to whether the global path(s) of the link(s) to the current entry is desired.

Then, if the global path is not desired, the reverse lookup operation 800 ends 895.

However, if the global path is desired, the reverse lookup operation 800 calls subprocess "Determine Global Path" 1100. After the global path of every name of the current entry has been returned by subprocess 1100, the reverse lookup operation 800 ends 895.

It will be appreciated by one with skill in the art that the invention disclosed herein is not limited to the sequence of steps depicted in FIG. 8 or the other flowcharts. In other embodiments, the operation 800 may be performed as a singular operation without calling subprocesses. In other embodiments, the inputs and outputs of the operation are passed as values, references and/or stored in accessible memory locations.

A. Determine Name for Single Count

Figure 9:
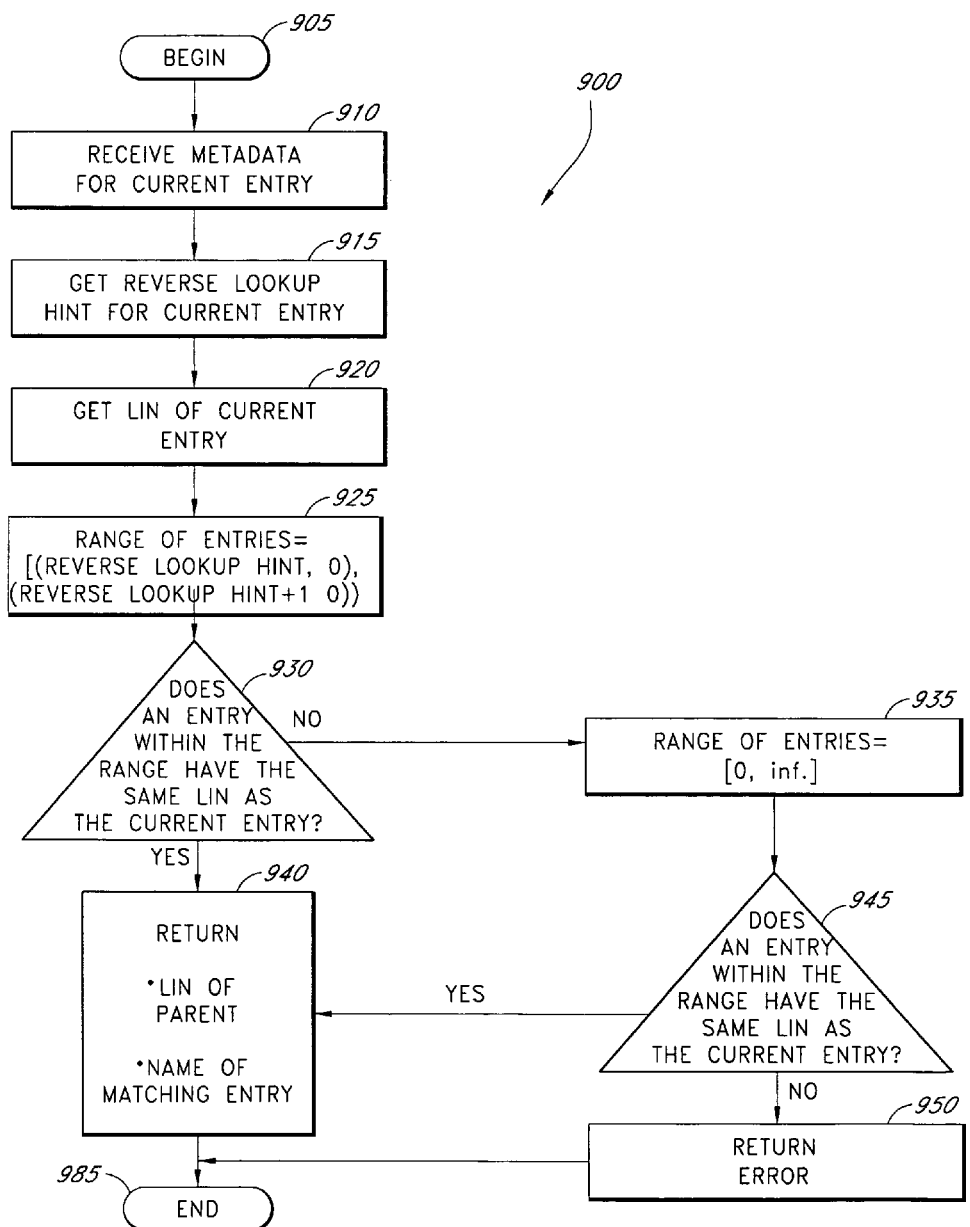
FIG. 9 illustrates one embodiment of a flowchart of operations for a subprocess of the reverse lookup operation directed to an inode that has a single link to a single parent.

FIG. 9 illustrates one embodiment of a flowchart of operations for a subprocess 900 of the reverse lookup operation 800 directed to an inode that has a single link to a single parent. The subprocess 900 begins 905 by receiving the metadata for the current entry 910. From the metadata, the subprocess 900 gets (a) the reverse lookup hint for the current entry 915, and (b) the LIN of the parent directory 920.

In block 925, the reverse lookup hint determines a range of entries that could include the current entry. In the illustrated embodiment, the initial range of entries is based on the reverse lookup hint and spans the following set of keys: [(Reverse Lookup Hint, 0), (Reverse Lookup Hint +1, 0)). That is, in one embodiment, the range of entries includes all keys with the reverse lookup hint. Thus, when the reverse lookup hint is not a stale hint or a hint for a link to another parent, the current entry will be found in the initial range of entries. Using a reverse lookup hint rather than searching every entry in the B-tree may reduce the amount of time needed to identify a matching entry.

In embodiments where the reverse lookup hint is the hint 400, the initial range will include entries with keys that vary only by sequence number. In other embodiments, variations in the relationship between the hint and the reverse lookup hint may affect the range of entries. For example, if the reverse lookup hint represents only a portion of the hint, the range will be wider. However, if the reverse lookup hint represents the hint plus a portion of the sequence number, the range will be narrower.

After the range is determined, the subprocess determines whether an entry in the range of entries has the same LIN as the current entry 930. If an entry in the range has a matching LIN, the subprocess 900 returns the LIN of the currently examined parent of the matching entry (that is, the "current parent") and the name or identifier associated with the matching entry 940. In other embodiments, only the name of the matching entry or the LIN is returned. In yet other embodiments, other information associated with the link to the matching entry may be returned.

However, if, in decision block 930, no entry in the range has a LIN that matches the current entry, the range of entries is expanded to include all possible entries in the B-tree structure for the parent inode 935. That is, the range of entries becomes [0, inf.]. Then, the operation in block 945 is performed in order to find a matching entry within the new range. If found, subprocess 900 returns the LIN of the current parent and the name of the matching entry 940.

In some embodiments, though unexpected, if the subprocess 900 is unable to identify a matching entry amongst all of the entries in the B-tree structure 945, the subprocess 900 indicates that the Parent (Count) field includes erroneous information (for example, by returning: "Error In Parent Count") 950 before ending 985. It is recognized that not all possible error conditions have been discussed with regard to the determine name for a single count process 900 and the other processes described herein. However, a person with ordinary skill in the art would be able to contemplate and account for these other possible error conditions.

While FIG. 9 illustrates one embodiment of a reverse lookup operation, it is recognized that other embodiments may be used. For example, the inputs and outputs may be passed as values, references, and/or stores in an accessible memory location.

B. Determine Name for Multiple Counts

FIG. 10 illustrates one embodiment of a flowchart of operations for a subprocess 1000 of the reverse lookup operation 800 directed to an inode that has multiple links from a single parent. The subprocess 1000 begins 1005 by (a) receiving metadata for the current entry 1010, and (b) getting from the metadata the LIN of the parent directory 1020 and the number links from the current parent. Then, the variable COUNT_TOTAL is assigned a value representative of the number of counts in the Parent (Count) for the current parent. Next, a counter variable, COUNT_CTR, is initialized to zero 1030.

In block 1035, the subprocess 1000 initiates a for loop for every entry in the B-tree structure associated with the current parent. In other words, every entry in the parent directory is considered. For every entry, the subprocess 1000 determines whether the LIN of the entry matches the LIN of the current entry 1040. If the entry is a matching entry, the subprocess 1000 gets and returns the name of the entry 1060 and then increments COUNT_CTR 1065. If COUNT_CTR is not equal to COUNT_TOTAL 1070, then subprocess 1000 considers the next entry in the for loop and determines if the next entry is a matching entry 1040. The subprocess 1000 returns the name of all matching entries 1060 and increments COUNT_CTR 1065 accordingly. Thus, when COUNT_CTR is equal to COUNT_TOTAL 1070, the for loop breaks 1075. Then, the subprocess 1000 gets and returns the LIN of the current parent 1055 before ending 1080.

However, though unexpected, if the for loop considers every entry in the B-tree structure before COUNT_CTR is equal to COUNT_TOTAL 1070, the for loop ends 1045. Then, the subprocess 1000 indicates that there is erroneous information stored in the Parent (Count) field of the metadata structure. In the illustrated embodiment, the subprocess 1000 will return "Error in Parent Count" 1050. Then, the subprocess 1000 gets and returns the LIN of the current parent 1055 before ending 1080. It is recognized that not all possible error conditions have been discussed with regard to the determine name for multiple counts process 1000 and the other processes described herein. However, a person with ordinary skill in the art would be able to contemplate and account for these other possible error conditions.

While FIG. 10 illustrates one embodiment of a reverse lookup operation, it is recognized that other embodiments may be used. For example, the inputs and outputs may be passed as values, references, and/or stores in an accessible memory location.

C. Determine Global Path

Figure 11:
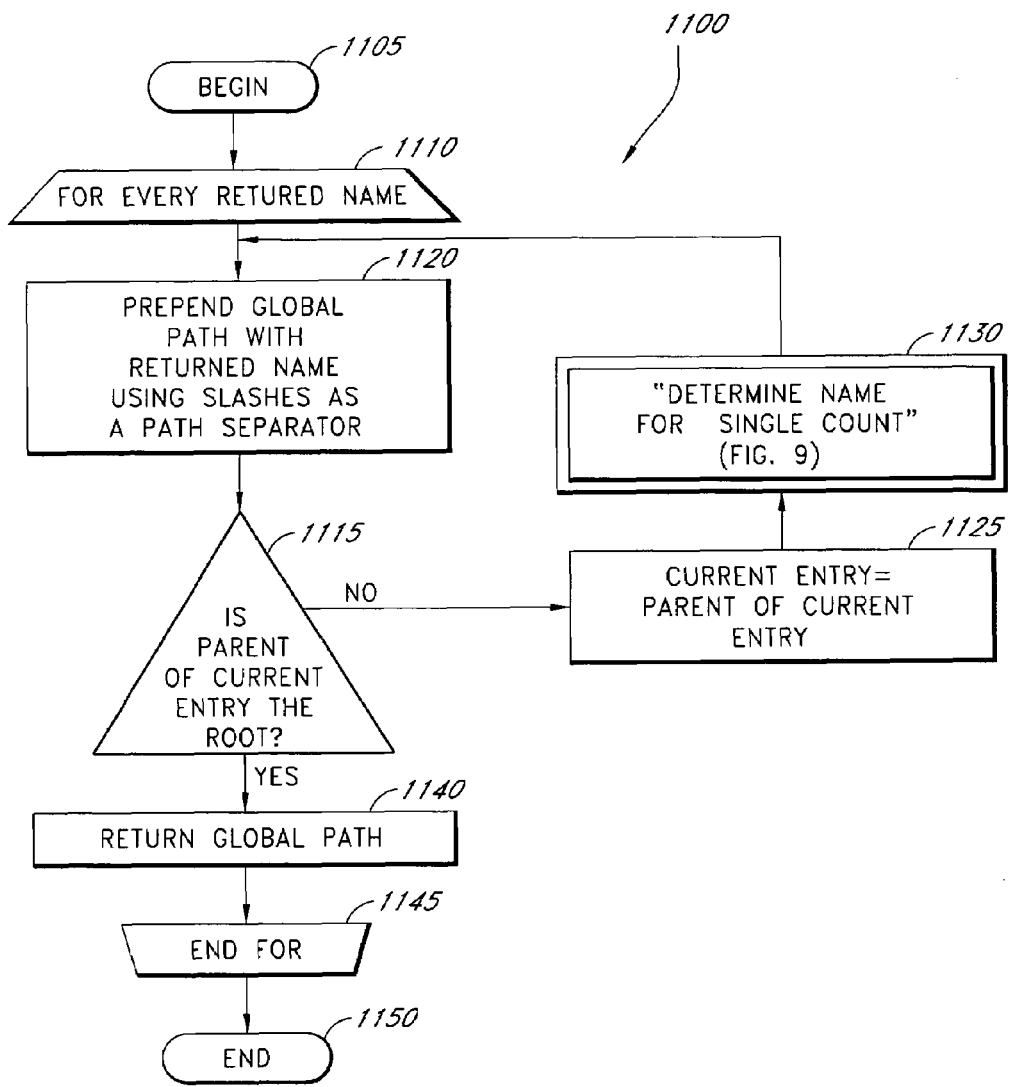
FIG. 11 illustrates one embodiment of a flowchart of operations for a subprocess of the reverse lookup operation directed to returning the global path of an inode.

If, in decision block 870 of FIG. 8, a user or client application wishes to return the global path(s) of the current entry, the reverse lookup operation 800 of FIG. 8 calls the subprocess "Determine Global Path" 1100. FIG. 11 illustrates one embodiment of a flowchart of operations for a subprocess 1100 of the reverse lookup operation 8000 directed to returning the global path(s) of link(s) to an inode. The subprocess 1100 begins 1105 by initiating a for loop for every name returned 1110 by the reverse lookup operation 800. For every name, the subprocess 1100 prepends the particular global path with the returned name using slashes as path separators 1120. Then, if the parent of the current entry is the root 1115, the subprocess 1100 returns the particular global path 1140.

However, if the parent of the current entry is not the root 1115, the parent of the current entry is designated the current entry 1125, and the subprocess "Determine Name for Single Count" 900 is called in block 1130. In the illustrated embodiment, every inode associated with a directory has only one link from one parent inode. Therefore, "Determine Name for Single Count" 900 is suitable for determining the name associated with the parents of directory inodes. In other embodiments, directory inodes may have multiple links to a parent inode or links to more than one parent inode. For these embodiments, one of ordinary skill in the art will recognize that the subprocess 1100 illustrated in FIG. 11 may be modified to recursively or iteratively call either "Determine Name for Single Count" 900 or "Determine Name for Multiple Counts" 1000 for each link to a parent inode.

After subprocess "Determine Name for Single Count" 900 executes, the subprocess 1100 prepends the returned name to the particular global path 1120 and determines whether the parent of the current entry is the root 1115. If it is, the particular global path is returned 1140. However, if it is not, the subprocess 1100 iteratively determines the name of every successive parent inode 1125, 1130 in the particular global path until it reaches an inode whose parent is the root 1115.

After the subprocess 1100 returns the global path for the first returned name 1140, the subprocess 1100 similarly returns the global path for every returned name. After the global path of all names have been returned 1140, the for loop 1145 and subprocess 1100 end 1150.

While FIG. 11 illustrates one embodiment of a reverse lookup operation, it is recognized that other embodiments may be used. For example, the inputs and outputs may be passed as values, references, and/or stores in an accessible memory location VIII. Exemplary Applications Referring, to FIG. 5, there are many examples for returning the name or identifier associated with a particular inode. In particular, the examples include, but are not limited to, (a) hint collisions, (b) multiply linked files, and (c) stale hints. Though other examples may exist, examples of the preceding special cases are described below with reference to the Figures.

A. Hint Collisions

Inode five 550 in FIG. 5 demonstrates the case of a hint collision. Referring to FIG. 8, the reverse lookup operation 800 for returning the name associated with the link to inode five 550 begins 805 by querying the client application 810 as to whether it wants only one or all names associated with the link to inode five 550. Supposing that the client application desires only one name associated with the link to inode five 550, the reverse lookup operation 800 calls subprocess 880 "Determine Name For Single Count" 900.

Referring to FIG. 9, subprocess 900 receives the metadata 910 for inode five 550. From the metadata, the subprocess 900 gets the reverse lookup hint 915 and LIN 925 of inode five 550. In FIG. 6E, the LIN field 642 indicates that the LIN is "5," and the Reverse Lookup Hint field 644 indicates that the Reverse Lookup Hint is "27." Therefore, in block 925, subprocess 900 designates the range of entries to include [(27, 0), (28, 0)). In other words, as written, the range of entries includes all entries with a key indicating that the hint is 27, but not key (28,0).

Next, the subprocess 900 examines the two entries (that is, the two entries with a hint collision) within the specified range, entries corresponding to links to inodes four 540 and five 550. It determines that an entry within the range has a LIN that matches the LIN 930 for inode five 550. Accordingly, subprocess 900 returns the LIN of the current parent and the name of the matching entry. Therefore, subprocess 900 returns the following:

NAME OF ENTRY: saved.txt
LIN OF PARENT: 2

After subprocess 900 finishes executing in block 880 of FIG. 8, the reverse lookup operation 800 queries the client application 870 as to whether the global path of inode five 550 is desired. Supposing the client application desires the global path of inode five 550, the reverse lookup operation 800 determines the global path for each returned name by calling subprocess "Determine Global Path" 1100 in step 890.

Referring to FIG. 11, the reverse lookup operation begins 1105 and performs a set of operations on every returned name using a for loop 1110, 1145. However, in this example, the operations in the for loop are executed only once because there is only one returned name.

First, the subprocess 1100 prepends the name "/saved.txt" to the global path 1120. Then, the subprocess 1100 determines that the parent of inode five 550 is not the root 1115. Next, the parent inode of inode five 550, inode two 520, becomes the current entry 1125.

In block 1130, the subprocess 1100 calls subprocess "Determine Name for Single Count" 900 using inode two 520 as the current entry. "Determine Name for Single Count" 900, using reverse lookup hint: 4, LIN: 2, and a Parent (Count): 1(1), determines from the B-tree structure depicted in FIG. 6B, that the name of the link to inode two 520 is "docs."

Next, the subprocess prepends "/docs" to the global path 1120 and determines that the parent of inode two 520 is the root 1115. Accordingly, subprocess 1100 returns the global path. Therefore, subprocess 1100 returns the following:

GLOBAL PATH: /docs/saved.txt

B. Multiply Linked Files

Inode four 540 in FIG. 5 demonstrates an example of multiply linked files. Referring to FIG. 8, the reverse lookup operation 800 begins 805 by querying the client application 810 as to whether only one name or all names associated with inode four 540 are desired. Supposing that all names for inode four 540 are desired, the reverse lookup operation 800 executes a for loop for each parent in the Parent (Count) field 633 of FIG. 6D. In particular, the Parent (Count) field 633 for inode four 540 includes the value "2(2), 3(1)." Thus, the operations in for loop 820 will execute two times, once for parent inode two 520 and once for parent inode three 530.

Figure 6D:
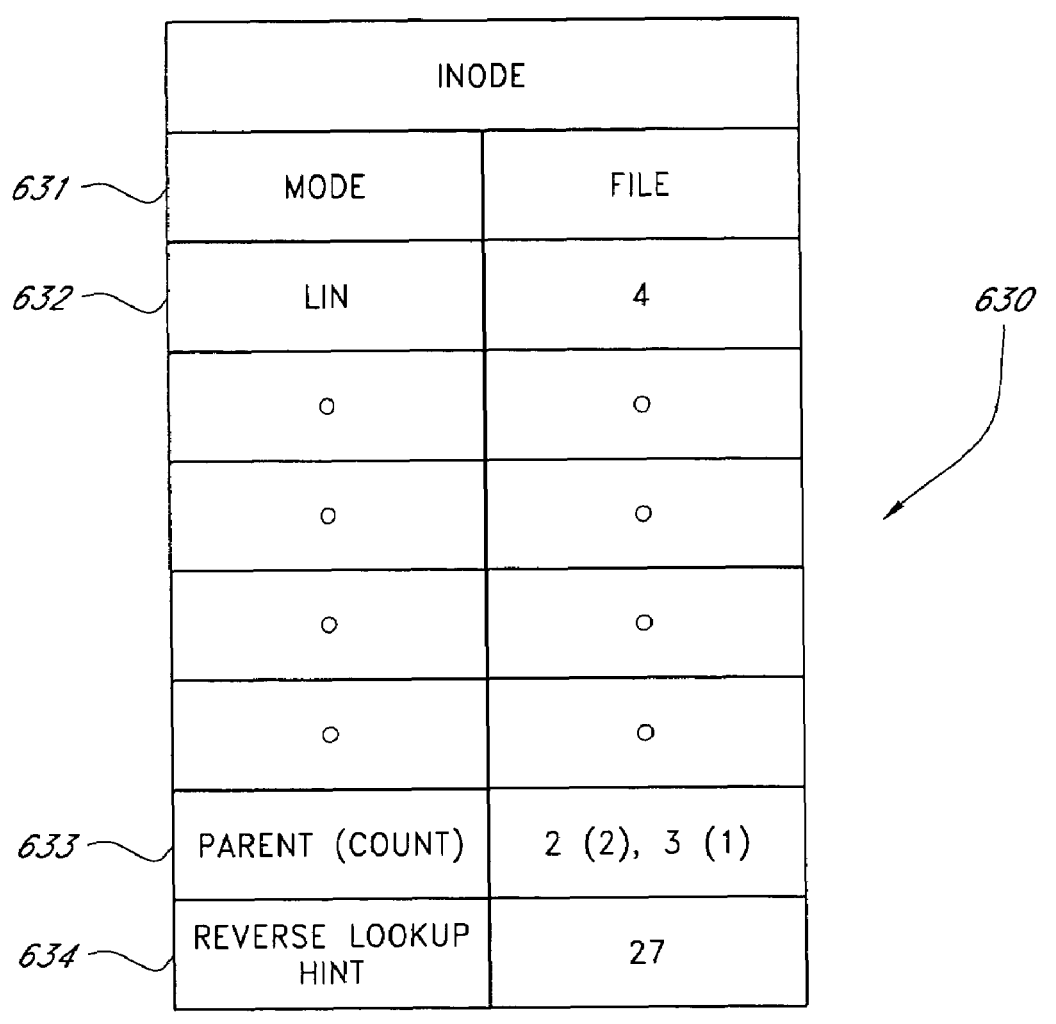
Figure 6E:
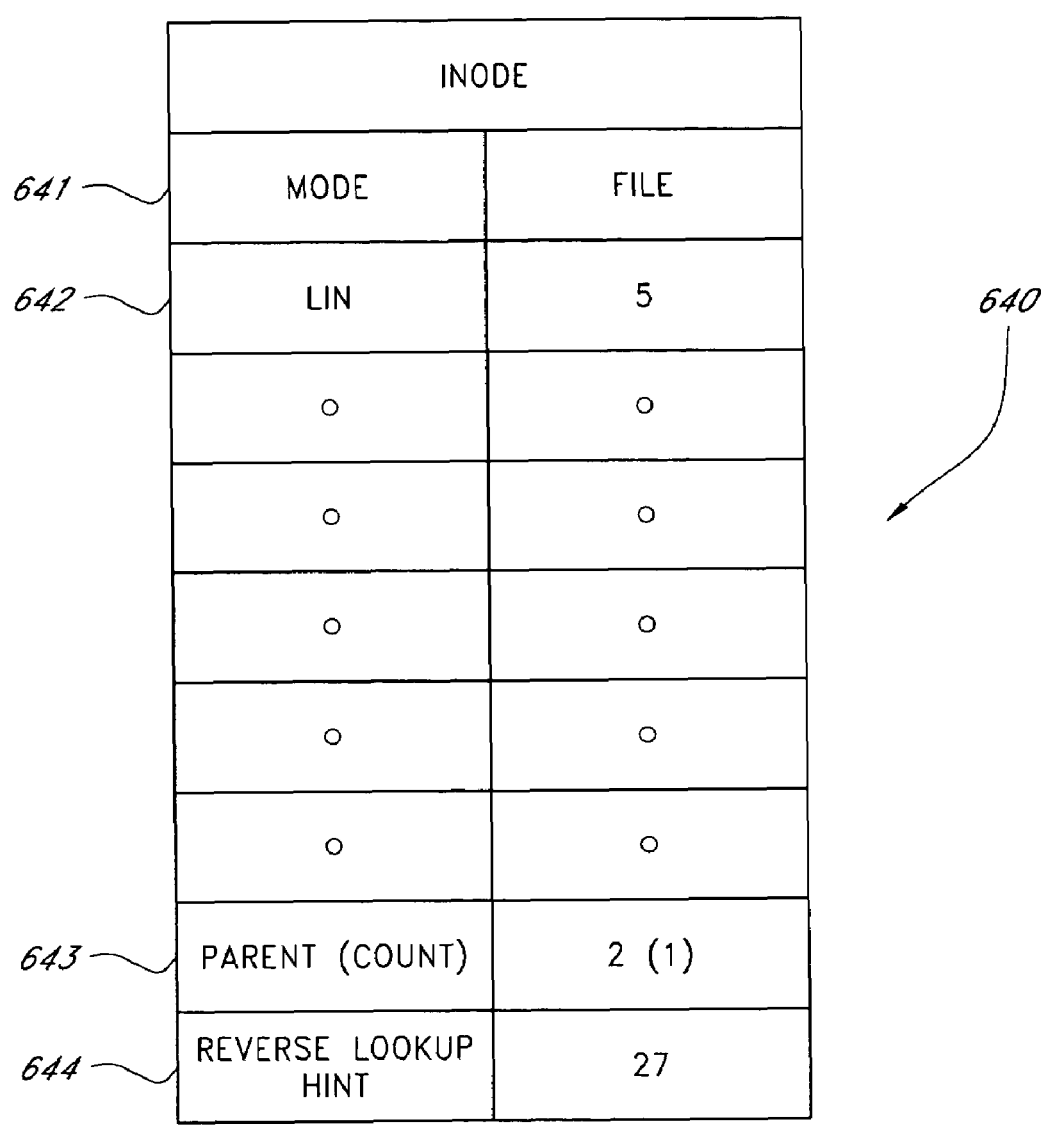

For inode three 530, the reverse look up operation determines that the parent has only one count 830 and will execute the subprocess "Determine Name for Single Count" 900 using the reverse lookup hint "27" from the Reverse Lookup Hint field 634 of FIG. 6D. First, subprocess 900 will determine whether a matching entry exists 930 within the range of entries spanning key values [(27,0), (28, 0)) 925. Referring to the B-tree structure for parent inode three 530 in FIG. 7C 720, no matching entries exist within the range. Consequently, subprocess 900 expands the range of entries 935 to include all of the entries in the B-tree structure for inode three 530 and repeats the operation in block 930.

Then, the subprocess determines that entry 724 is a matching entry because LIN "4" is equal to the LIN for inode four 540. Accordingly, subprocess 900 returns the name of the matching entry and the LIN of the current parent 940. Therefore, subprocess 900 returns the following:

NAME OF ENTRY: file.txt
LIN OF PARENT: 3

Next, the for loop 820 of FIG. 8 examines the next parent, inode two 520, in the Parent (Count) field 633. Because parent inode two 520 is multiply linked to the current entry 830, the reverse lookup operation calls subprocess "Determine Name for Multiple Counts" 1000 in block 840.

"Determine Name for Multiple Counts" 1000 assigns to COUNT_TOTAL the value "2" because parent inode two 520 has two links to inode four 540. Next, the subprocess 1000 searches all of the entries in the B-tree structure for inode two 520 and determines that the entries corresponding to keys (12, 0) and (27, 0) are matching entries 1040. Therefore, for each matching entry, the subprocess 1000 returns the name of the matching entry 1060 and increments the counter 1065. Because the counter has been incremented twice, COUNT_CTR is equal to COUNT_TOTAL 1070 and the for loop breaks 1075.

Next, in step 1055, the subprocess 1000 gets and returns the LIN of the current parent 1055. Therefore, subprocess 1000 returns the following:

NAME OF ENTRY: world.txt

NAME OF ENTRY: hello.txt

LIN OF PARENT: 2

Returning to FIG. 8, supposing the client application desires to return the global path for each returned name in decision block 870, the reverse lookup operation will call the subprocess "Determine Global Path" 1100 in block 890. As described above, "Determine Global Path" returns the global path 1140 for every returned name 1110. Accordingly, subprocess 1100 returns the following:

GLOBAL PATH: /temp/file.txt

GLOBAL PATH: /docs/world.txt

GLOBAL PATH: /docs/hello.txt

C. Stale Hint

Inode seven 570 in FIG. 5 demonstrates an example of a stale hint. As described previously in reference to FIG. 5, inode seven 570 was initially linked to parent inode three 530 via pointer 578. As a result, the reverse lookup hint in the Reverse Lookup Hint field 664 for inode seven 570 corresponds to "old.txt." That is, the reverse lookup hint is a stale hint.

Referring to FIG. 8, when the reverse lookup operation 800 begins 805, the operation 800 will first query the client application 810 as to whether one or all names associated with the links to inode seven 570 are desired. Supposing that only one name is desired, the reverse lookup operation will call subprocess "Determine Name for Single Count" 900 in step 880.

Referring to FIG. 9, the subprocess 900 will retrieve the metadata 910 for inode seven 570 and subsequently obtain the reverse lookup hint 915, "34", and LIN 920, "7", for the current entry. Accordingly, the range of entries will initially include keys within the range [(34,0), (35,0)) 925.

In decision block 930, the subprocess 900 will determine whether there is a matching entry within the range that has the same LIN as the current entry. As shown in FIG. 7C, no entries have a LIN equal to 7. Consequently, in step 935, the range of entries is expanded to include all entries in the B-tree structure 720 that corresponds to parent inode three 530. Next, the subprocess 900 will process the operation of decision block 945 with the new range. FIG. 7C indicates that of the four entries 724, 725, 728, 729 in the B-tree structure 720, entry 728 is a matching entry.

Next, the subprocess will return the LIN of the parent inode and the name of the matching entry 940. Therefore, subprocess 900 returns the following:

NAME OF ENTRY: new.txt

LIN OF PARENT: 3

Subprocess 900 will then end 985, and supposing the client application does not desire the global path 890, the reverse lookup operation 800 also ends 895.

IX. Other Embodiments

While certain embodiments of the invention have been described, these embodiments have been presented by way of example only, and are not intended to limit the scope of the present invention. Accordingly, the breadth and scope of the present invention should be defined in accordance with the following claims and their equivalents.

By way of example, the following alternatives are also contemplated. Although the data structures described herein have been directed to a distributed file system, some embodiments of the invention may be used in a single file system. The reverse lookup may also be implemented in systems that do not include file systems such as, for example, in-memory lookup tables and databases. Additionally or alternatively, in the embodiments that comprise a historical flat-file directory, the offset of the directory entry may be used as the reverse lookup hint. Further, directories structured according to Patricia tries and hash tables may also be used. Additionally, it is recognized that the reverse lookup hint may represent only a portion of the key when an ordered mapping structure such as, for example, a B-tree implementation is used. In contrast, the reverse lookup hint may represent the entire key when a non-ordered mapping structure such as, for example, a hash table implementation is used. The inherent properties of these structures present data values that may be used as reverse lookup hints. Alternatively, one of ordinary skill in the art will appreciate that the reverse lookup hint need not be explicitly used by the search data structure; rather, the reverse lookup hint may be present as a side-effect of the organization scheme used.

The above-mentioned alternatives are examples of other embodiments, and they do not limit the scope of the invention. It is recognized that a variety of data structures with various fields and data sets may be used. In addition, other embodiments of the flow charts may be used.

What is claimed is:

1. A process for reverse lookups using a map structure and a structure referenced by the map structure comprising:

accessing, by a computer processor, a first data structure, the first data structure comprising a first reverse lookup hint and a reference to a second data structure, the first data structure related to a file or directory and the reference to the second data structure related to a parent directory of the file or directory;

identifying, by a computer processor, at least one matching entry in a first name map structure using the first reverse lookup hint, the first name map structure related to the parent directory, the at least one matching entry in the first name map structure corresponding to the file or directory and including a name of the file or directory;

using the reference to the second data structure to access, by a computer processor, the second data structure, the second data structure comprising a second reverse lookup hint and a reference to a third data structure, the reference to the third data structure related to a grandparent directory of the file or directory;

identifying, by a computer processor, at least one matching entry in a second name map structure using the second reverse lookup hint, the second name map structure related to the grandparent directory, the at least one matching entry in the second name map structure corresponding to the parent directory and including a name of the parent directory;

using the reference to the third data structure to access, by a computer processor, the third data structure, the third data structure comprising a third reverse lookup hint; and identifying, by a computer processor, at least one matching entry in a third name map structure using the third reverse lookup hint, the at least one matching entry in the third name map structure corresponding to the grandparent directory and including a name of the grandparent directory.

2. The process for reverse lookups of claim 1, wherein the at least one matching entry in the first name map structure comprises a filename associated with the first data structure.

3. The process for reverse lookups of claim 1, wherein the first reverse lookup hint assists in locating a key in the first name map structure.

4. The process for reverse lookups of claim 1, further comprising returning the name associated with the at least one matching entry in the first name map structure.

5. The process for reverse lookups of claim 1, further comprising:

searching a subset of entries in the first name map structure for the at least one matching entry in the first name map structure; and if the subset of entries does not comprise the at least one matching entry, searching all of the entries in the first name map structure for the at least one matching entry.

6. The process for reverse lookups of claim 1, further comprising returning a portion of a filename path related to the at least one matching entry in the first name map structure, wherein the portion of the filename path is less than a global filename path.

7. The process for reverse lookups of claim 1, further comprising returning a portion of a first filename path and a portion of a second filename path related to the at least one matching entry in the first name map structure, wherein the portion of the first filename path and the portion of the second filename path are less than a global filename path.

8. The process for reverse lookups of claim 1, wherein the first map structure, the second map structure, or the third map structure is at least one of a B-tree, a Patricia tree, a hash table, a red-black tree, and a flat file directory.

9. The process for reverse lookups of claim 1, wherein the first name map structure and the second name map structure correspond to a directory map, and the first data structure, the second data structure, and the third data structure correspond to an inode.

10. The process for reverse lookups of claim 1, wherein the first data structure relates to a file in a distributed file system, the second data structure relates to a user created directory in the distributed file system, and the third data structure relates to a user created directory in the distributed file system.

11. The process for reverse lookups of claim 1, wherein the first reverse lookup hint, the second reverse lookup hint, or the third reverse lookup hint is a hash value of a name.

12. A tangible storage medium having a computer program stored thereon for causing a suitable programmed system to process computer-program code by performing the process of claim 1 when such program is executed on the system.

13. A distributed file system configured to perform reverse lookups, the distributed file system comprising:

a plurality of storage devices each storage device in communication via a network, each storage device comprising a processor and a memory for storing data;

a plurality of files that are logically organized in a tree and each file distributed over the network so as to be stored, in parts, across the memory of two or more of the plurality of nodes;

at least one of the plurality storage devices storing structure data in the memory, the structure data comprising:

a name map structure corresponding to a parent directory of the tree and comprising:

a first set of structures corresponding to children files of the parent directory, each of the first set of structures comprising:

a filename associated with the corresponding structure; and a file reference to a file metadata file corresponding to the filename;

the file metadata file comprising:

a parent directory reference to a directory metadata file corresponding to a parent directory of the corresponding file; and a first reverse lookup hint that is used to locate the file reference in the name map structure.

14. The distributed file system of claim 13, the at least one storage device further comprising:

a reverse lookup module stored on the memory configured to:

receive the first reverse lookup hint and a file reference of one of the first set of structures;

locate one or more entries in the name map structure that correspond to the first reverse lookup hint; and identify at least one matching entry in the name map structure that corresponds to the file reference.

15. The distributed file system of claim 14, wherein the at least one matching entry comprises at least one filename associated with one of the children files of the parent directory, and the reverse lookup module is further configured to return the at least one filename.

16. The distributed file system of claim 13, wherein the first reverse lookup hint comprises a key.

17. A distributed file system for processing reverse lookups, the distributed file system comprising:

a plurality of data storage devices configured to communicate with each other, each data storage device comprising a processor and a memory;

a first module stored in the memory of at least one of the plurality of data storage devices, the processor configured to run the first module, the first module configured to:

access a first data structure, the first data structure comprising a first reverse lookup hint and a reference to a second data structure, the first data structure related to a file or directory and the reference to the second data structure related to a parent directory of the file or directory;

identify at least one matching entry in a first name map structure using the first reverse lookup hint, the first name map structure related to the parent directory, the at least one matching entry in the first name map structure corresponding to the file or directory;

use the reference to the second data structure to access the second data structure, the second data structure comprising a second reverse lookup hint and a reference to a third data structure, the reference to the third data structure related to a grandparent directory of the file or directory;

identify at least one matching entry in a second name map structure using the second reverse lookup hint, the second name map structure related to the grandparent directory, the at least one matching entry in the second name map structure corresponding to the parent directory;

use the reference to the third data structure to access the third data structure, the third data structure comprising a third reverse lookup hint; and identify at least one matching entry in a third name map structure using the third reverse lookup hint, the at least one matching entry in the third name map structure corresponding to the grandparent directory.

18. The distributed file system of claim 17 wherein each of the first data structure, the second data structure, and the third data structure are stored in memories of at least two of the plurality of storage devices.

19. The distributed file system of claim 17 wherein the first data structure relates to a file stored in the distributed file system, the second data structure relates to a user created directory in the distributed file system, and the third data structure relates to a user created directory in the distributed file system.

* * * * *

UNITED STATES PATENT AND TRADEMARK OFFICE
CERTIFICATE OF CORRECTION

PATENT NO. : 7,590,652 B2  Page 1 of 1
APPLICATION NO. : 11/507075
DATED : September 15, 2009
INVENTOR(S) : Aaron J. Passey et al.

It is certified that error appears in the above-identified patent and that said Letters Patent is hereby corrected as shown below:

Title Page
In column 2 (item 56), page 3, line 49, under Other Publications, change "2008Int'l" to --2008 Int'l--.

In column 2 (item 56), page 4, line 3, under Other Publications, change "polices" to --policies--.

In Drawings
In sheet 4 of 23 (reference numeral 281) (FIG. 2C), line 1, change "META DATA" to --METADATA--.

In sheet 5 of 23 (reference numeral 315) (FIG. 3), line 1, change "FUNTION" to --FUNCTION--.

In sheet 23 of 23 (reference numeral 1110) (FIG. 11), line 1, change "RETURED" to --RETURNED--.

In column 10, line 23, change "root-directory." to --root directory.--.

In column 12, line 32 (approx.), change "block." to --block--.

In column 12, line 52, after "860" insert --.--.

In column 15, line 27 (approx.), after "location" insert --.--.

In column 16, line 43 (approx.), change "look up" to --lookup--.

Signed and Sealed this

Eleventh Day of May, 2010

David J. Kappos
*Director of the United States Patent and Trademark Office*